United States Patent
Romano et al.

(10) Patent No.: US 7,015,957 B2
(45) Date of Patent: *Mar. 21, 2006

(54) CAMERA THAT DOWNLOADS ELECTRONIC IMAGES HAVING METADATA IDENTIFYING IMAGES PREVIOUSLY EXCLUDED FROM FIRST IN-FIRST OUT OVERWRITING AND METHOD

(75) Inventors: Nathan J. Romano, Rochester, NY (US); Stephen G. Malloy Desormeaux, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 665 days.

This patent is subject to a terminal disclaimer.

(21) Appl. No.: 09/946,051

(22) Filed: Sep. 4, 2001

(65) Prior Publication Data

US 2004/0201733 A1    Oct. 14, 2004

(51) Int. Cl.
  *H04N 5/76* (2006.01)
  *H04N 5/225* (2006.01)
  *G03B 17/48* (2006.01)
(52) U.S. Cl. .............................. 348/231.1; 348/213.3; 348/207.1; 396/429
(58) Field of Classification Search ............. 348/231.1, 348/231.2, 231.3, 231.9, 64, 344, 207.1; 396/429; 386/38, 117, 118; 358/906, 909.1
  See application file for complete search history.

(56) References Cited

U.S. PATENT DOCUMENTS

| | | | |
|---|---|---|---|
| 4,868,642 A | | 9/1989 | Kaneko |
| 5,164,831 A | | 11/1992 | Kuchta et al. |
| 5,619,257 A | | 4/1997 | Reele et al. |
| 5,682,197 A | | 10/1997 | Moghadam et al. |
| 5,845,166 A | * | 12/1998 | Fellegara et al. ........... 396/429 |
| 5,905,528 A | | 5/1999 | Kodama |
| 5,926,218 A | | 7/1999 | Smith |
| 5,940,121 A | | 8/1999 | McIntyre et al. |
| 5,978,016 A | | 11/1999 | Lourette et al. |
| 6,055,381 A | * | 4/2000 | Maruyama ................... 396/207 |
| 6,092,023 A | | 7/2000 | Kunishige et al. |
| 6,217,515 B1 | * | 4/2001 | Yamakawa et al. ......... 600/437 |
| 6,421,080 B1 | * | 7/2002 | Lambert ..................... 348/143 |
| 6,549,232 B1 | * | 4/2003 | Taniguchi et al. ..... 348/231.99 |
| 6,567,121 B1 | * | 5/2003 | Kuno ....................... 348/211.3 |
| 6,683,650 B1 | * | 1/2004 | Yamamoto et al. .... 348/333.12 |
| 2001/0050875 A1 | * | 12/2001 | Kahn et al. ................. 365/229 |

FOREIGN PATENT DOCUMENTS

| | | |
|---|---|---|
| EP | 0 851 274 A | 7/1998 |
| EP | 0 860 982 A | 8/1998 |
| JP | 11 352577 | 12/1999 |

* cited by examiner

*Primary Examiner*—Lin Ye
(74) *Attorney, Agent, or Firm*—Robert Luke Walker

(57) ABSTRACT

A camera, method, and system provide downloaded electronic images that have metadata identifying individual images previously excluded, within the camera, from first in-first out overwriting. In the method, a first plurality of electronic images are captured in the camera and the camera memory is filled to capacity. A second plurality of electronic images are then captured in the camera. Individual tags are selectively assigned to one or more of the electronic images. During the capturing of the second plurality of electronic images, untagged images are replaced in the memory on a first in-first out basis and tagged images are retained in the memory. The tagged and untagged electronic images are downloaded together to provide a set of downloaded images external to the camera. The downloaded images corresponding to the tagged electronic images have retained tags.

5 Claims, 14 Drawing Sheets

| FIG. 2A | FIG. 2B |

FIG. 2

CAMERA THAT DOWNLOADS ELECTRONIC IMAGES HAVING METADATA IDENTIFYING IMAGES PREVIOUSLY EXCLUDED FROM FIRST IN-FIRST OUT OVERWRITING AND METHOD

CROSS REFERENCE TO RELATED APPLICATIONS

Reference is made to commonly assigned, U.S. patent applications Ser. No. 09/945,989, entitled: CAMERA HAVING SINGLE-BUTTON TIMED DISPLAY OF MOST-RECENTLY VIEWED IMAGE AND DEFAULT DISPLAY OF LAST VERIFICATION IMAGE AND METHOD, filed 4 Sep. 2001, in the name of Stephen G. Malloy Desormeaux; Ser. No. 09/945,890, entitled: HYBRID FILM-ELECTRONIC CAMERA HAVING A DYNAMIC NUMBER OF STORED ELECTRONIC IMAGES PROTECTED FROM OVERWRITING AND METHOD, filed 4 Sep. 2001, in the name of Stephen G. Malloy Desormeaux; Ser. No. 10/022,491, entitled: CAMERA HAVING SELECTIVE IMAGE EXCLUSION FROM FIRST IN-FIRST OUT ELECTRONIC IMAGE OVERWRITING AND METHOD, filed 18 Dec. 2001 in the name of Stephen G. Malloy Desormeaux, which is a Continuation-In-Part application of Ser. No. 09/945,496, entitled: CAMERA HAVING SELECTIVE IMAGE EXCLUSION FROM FIRST IN-FIRST OUT ELECTRONIC IMAGE OVERWRITING AND METHOD, filed 4 Sep. 2001, in the name of Stephen G. Malloy Desormeaux, now abandoned; and Ser. No. 09/946,098, entitled: CAMERA HAVING ELECTRONIC IMAGES CORRESPONDING TO CURRENT FILM IMAGES AUTOMATICALLY EXCLUDED FROM FIRST IN-FIRST OUT OVERWRITING AND METHOD, filed 4 Sep. 2001, in the name of Stephen G. Malloy Desormeaux and Robert Hills.

FIELD OF THE INVENTION

The invention relates to photography and photographic equipment and more particularly relates to cameras and methods in which downloaded electronic images have metadata that identifies which images were previously excluded from first in-first out overwriting.

BACKGROUND OF THE INVENTION

Hybrid electronic-film cameras allow photographers to capture scene images (the light images of particular scenes) as latent images on photographic film and as electronic images that are digitized and stored in memory. The electronic images are retained in the memory until being overwritten or being removed, such as by withdrawal of a removable memory unit. The electronic images are made available for use by downloading into a computer or other device. The photographer is generally allowed to view electronic images in the memory of the camera. The issue is, how should that memory be managed in attempting to meet the photographer's needs and expectations.

One of the problems is that the available space for latent images in a film unit and electronic images in memory can be the same; but this is not generally the case. One of the reasons is that the camera can accommodate film units having different numbers of film frames and the memory is fixed in size or is subject to change in a different manner. Another reason in some hybrid cameras, is that the camera can capture both electronic images that correspond to concurrently captured film images and electronic images that are captured without any concurrent film image. In most cases, thus, there is a disparity between the number of latent images in a film unit in the camera and the number of electronic images currently in the memory of the camera.

It is straightforward that photographers would like to be able to review every electronic image in camera memory corresponding to a latent image in a film unit currently present in the camera. It is not so straightforward how to handle electronic images in the memory of the camera that can do not correspond to latent image images in the film unit in the camera. Those electronic images can have been captured without a corresponding film image or can be electronic images that correspond to a latent image in an earlier film unit that has since been unloaded from the camera.

In his currently impractical to supply so much memory in a hybrid camera that all electronic images that a photographer is likely to have an interest in reviewing indefinitely remain available for the photographer to review. Thus, some electronic images in the memory must be overwritten during use. This overwriting can be done on a first in-first out (FIFO) basis. This approach does not take into account the fact that memory needed for review of electronic images corresponding to film images in a film unit in the camera is not static. This approach weights all electronic images equally and does not take into account any possibility of the photographer having different levels of interest in different electronic images. For example, the photographer may want to download some electronic images for later use and may intend to never use others of the electronic images.

It would thus be desirable to provide improved hybrid electronic-film cameras and methods which download images that retain an indication of earlier photographer interest.

SUMMARY OF THE INVENTION

The invention is defined by the claims. The invention, in its broader aspects, provides a camera, method, and system which furnish downloaded electronic images that have metadata identifying individual images previously excluded, within the camera, from first in-first out overwriting. In the method, a first plurality of electronic images are captured in the camera and the camera memory is filled to capacity. A second plurality of electronic images are then captured in the camera. Individual tags are selectively assigned to one or more of the electronic images. During the capturing of the second plurality of electronic images, untagged images are replaced in the memory on a first in-first out basis and tagged images are retained in the memory. The tagged and untagged electronic images are downloaded together to provide a set of downloaded images external to the camera. The downloaded images corresponding to the tagged electronic images have retained tags.

It is an advantageous effect of the invention that improved hybrid electronic-film cameras and methods are provided in which downloaded images retain metadata tags, which were assigned in the camera to prevent first in-first out overwriting and indicate photographer interest in the respective image.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
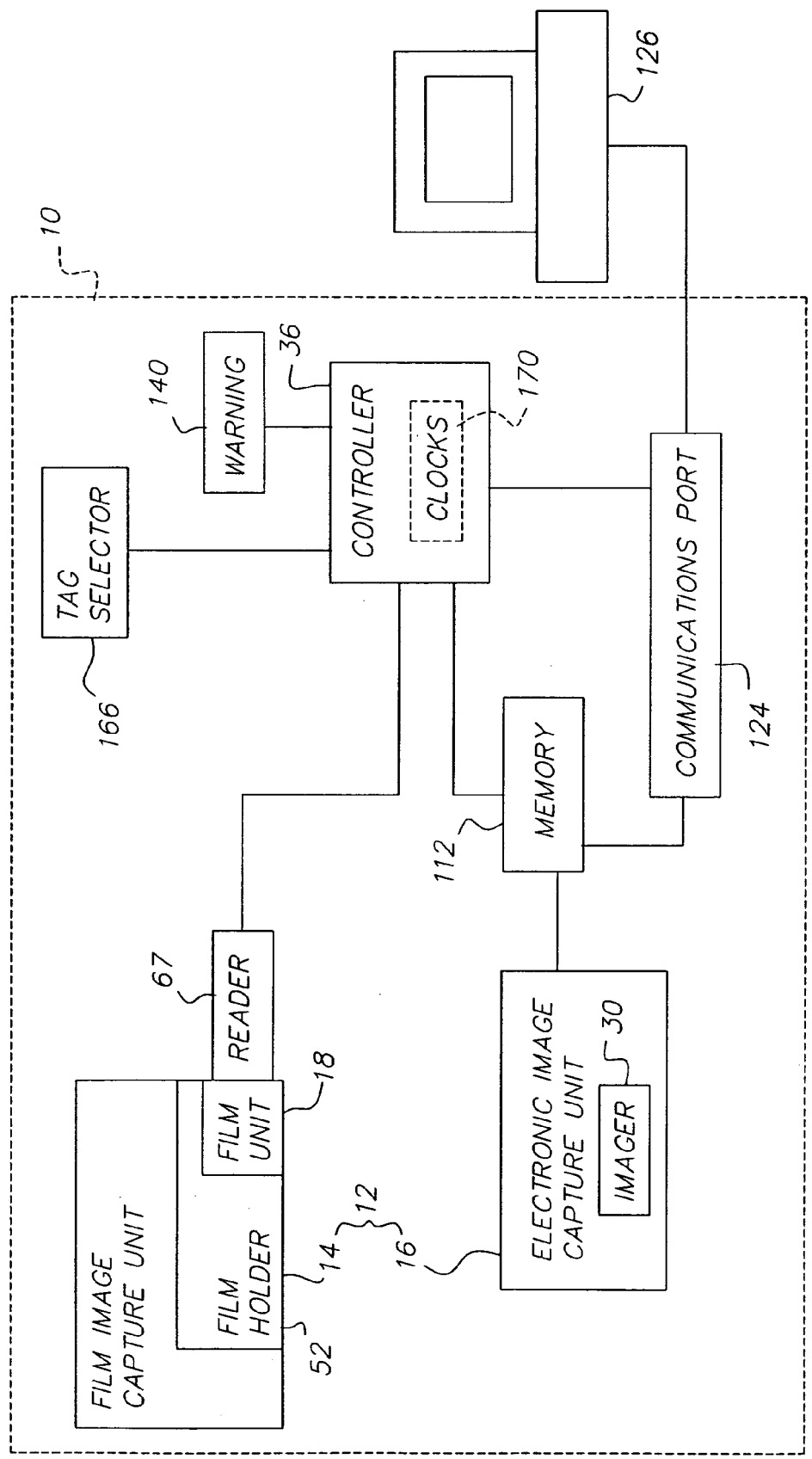
FIG. 1 is a diagrammatical view of the cameras and system.

In the following, feature sets of the several different cameras and methods are discussed in terms of particular embodiments combining all or many of those features. Alternative embodiments combining fewer features and alternative features are also discussed herein. Other alternatives will be apparent to those of skill in the art.

The cameras 10 herein each provide both an archival image of a scene and an evaluation image of the same scene. The archival image and the evaluation image are captured concurrently. The archival image is later used in photofinishing, or printing, or other long term or relatively long term use. The evaluation image is immediately available for display and review by the user.

Some of the cameras 10 discussed herein have embodiments with a single electronic imager that is used to capture a scene image as an initial electronic image. Both an archival image and an evaluation image are generated from the initial electronic image. The evaluation image can be subsampled from an original electronic image so as to provide lower resolution derived images. The lower resolution derived images can be provided using the method described in commonly-assigned U.S. Pat. No. 5,164,831, entitled "ELECTRONIC STILL CAMERA PROVIDING MULTI-FORMAT STORAGE OF FULL AND REDUCED RESOLUTION IMAGES", to Kuchta, et. al.

In currently preferred embodiments, the cameras 10 have a capture system 12 that has an archival image capture unit 14 and a separate evaluation image capture unit 16. The two different capture units 14,16 can take a variety of forms and can be completely separate from each other or can share some components. The evaluation image capture unit 16 captures a scene image electronically and can also be referred to as an electronic image capture unit 16. The archival image capture unit 14 captures and stores images in a film unit 18.

The term "film unit 18" is used herein to refer to media 20 on which image data is or can be stored for archival purposes, with or without media modification, and physically associated features supporting use of the media. Each film unit 18 stores or can store a plurality of archival images. In a film-type film unit 18, the media 20 is a photographic filmstrip 20a. The support structure 22 of a film-type film unit 18a generally provides light blocking and, for example, can include a spool 22a on which the filmstrip 20a is wound and canister 22b enclosing the filmstrip 20a and spool 22a. In an electronic-type film unit 18 the media 20 is removable digital storage media 20b. With digital storage media 20b, archival images are transferred in digital form for photofinishing, printing, or other use. A digital film unit 18, like a photographic film unit 18 is removable from the camera 10. The type of digital media used and the manner of information storage, such as optical or magnetic or electronic, is not critical. For example, a digital film unit can be a floppy disc, a CD, a DVD, a tape cassette, or flash memory card or stick.

The evaluation image capture unit 16 captures electronic images. The archival image capture unit 14 can be a photographic film image capture unit 14a that captures images on photographic film. Alternatively, the archival image capture unit 14 and evaluation image capture unit 16 can be two different electronic capture units. An example of a suitable digital camera having two such electronic capture units is described in U.S. Pat. No. 5,926,218, entitled "ELECTRONIC CAMERA 10 WITH DUAL RESOLUTION SENSORS", to Smith. The camera 10 can also alternatively allow use of either a film image capture unit 14a or an electronic capture unit as the archival image capture unit 14, at the selection of the photographer or on the basis of available storage space in one or another capture media or on some other basis. For example, a switch (not separately illustrated) can provide alternative film capture and electronic capture modes.

The invention is generally discussed herein in terms of film units 18a that use photographic film for storage of archival images as latent images and, optionally, store some additional information in the film unit 18, magnetically, optically, or both. It will be understood that equivalent considerations apply to other types of film units 18. For example, units of digital memory for individual archival images correspond to film frames (discussed in detail below).

Camera 10 features disclosed herein are particularly advantageous for hybrid cameras 10 having archival image units 14 that capture images using photographic film-type film units 18 as archival media 18 and also having electronic image units 16 that capture the evaluation images. This is not limiting. Advantages of specific embodiments will be readily apparent by simple experimentation implementing the particular features.

Referring now particularly to FIGS. 1–4, the camera 10 has a body 24 that holds a capture system 12 having an archival image capture unit 14 that uses photographic film 20a and an evaluation image capture unit 16 that captures images electronically. When the photographer trips a shutter release 26, a subject image (a light image of a scene) is captured as a latent image on a frame 28 of the film 20a and at least one electronic image is captured on an electronic array imager 30 of the evaluation image capture unit 16. The electronic image or images are digitally processed and used to provide one or more derived images that can be shown on an image display 32 mounted to the body 24.

The electronic images, as captured in analog form and after digitization, but not other modification, are referred to generically herein as "original electronic images". After further modification, the electronic images are referred to generically herein by the term "derived images". Derived images are modified relative to the original images. This can be for calibration to the display or a particular file structure, or matching to output media. These modifications may or may not also include the addition of metadata to the electronic image file. A derived image that is matched to the expected product of photofinishing the archival image is also referred to herein as a "verification image". More than one derived image can be made from a single original electronic image. A derived image that differs from the verification image in a predetermined manner, unrelated to expected photofinishing, is referred to herein as an "evaluation image". Modifications matched to expected photofinishing or other downstream use, may or may not also be present in an evaluation image.

A control system 34 that includes a controller 36 (also referred to herein as a microcomputer) and can also include a digital signal processor 38, controls other components of the camera 10 and performs processing related to the derived image.

The camera body 24 provides structural support and protection for the capture units 14,16 and other components. The body 24 of the camera 10 can be varied to meet requirements of a particular use and style considerations. It is convenient, if the body 24 has front and rear covers 40,42 joined together over a chassis 44. Many of the components of the camera 10 can be mounted to the chassis 44.

A film door 46 and a flip-up electronic flash unit 48 are pivotably joined to the covers 40,42 and chassis 44. The flash unit 48 is flipped up from partially covering the front cover 40 to uncover the taking lens 50, preparatory to using the camera 10. Flipping up the flash unit 48 closes a normally open main power switch 51 to electrically power on the camera 10. The type of main power switch 51 used and its manner of operation can be varied as desired. A power supply 53 accessed through the main power switch 51 is ordinarily one or more batteries.

The film image capture unit 14 has a film holder 52 that holds a film unit 18 during use. In the camera 10 of FIGS. 3–4, the film holder 52 is part of the chassis 44. The configuration of the film holder 52 is a function of the type of film unit 18 used and is not otherwise significant.

The film holder 52 includes a pair of film chambers 54,56 and a rearwardly opening exposure frame 58 between the film chambers 54,56. The film unit 18 has a canister 22b disposed in one of the chambers 54,56. A filmstrip 20a is wound around a spool 22a held by the canister 22b. During use, the filmstrip 20a extends across the exposure frame 58 and is wound into a film roll 60 in the other chamber 56. The exposure frame 58 has an opening 62 through which a light image exposes a frame 28 of the film at each picture taking event.

During use, the filmstrip 20a is moved by a film transport 64 out of the canister 22b of the film unit, is wound into a film roll 60 in the supply chamber 56, and is then returned to the canister 22b. The film transport 64, as illustrated, includes an electric motor 66 located within a film roll spool 68, but other types of motorized transport mechanisms and manual transports can also be used. Filmstrip exposure can be on film advance or on rewind.

Figure 3:
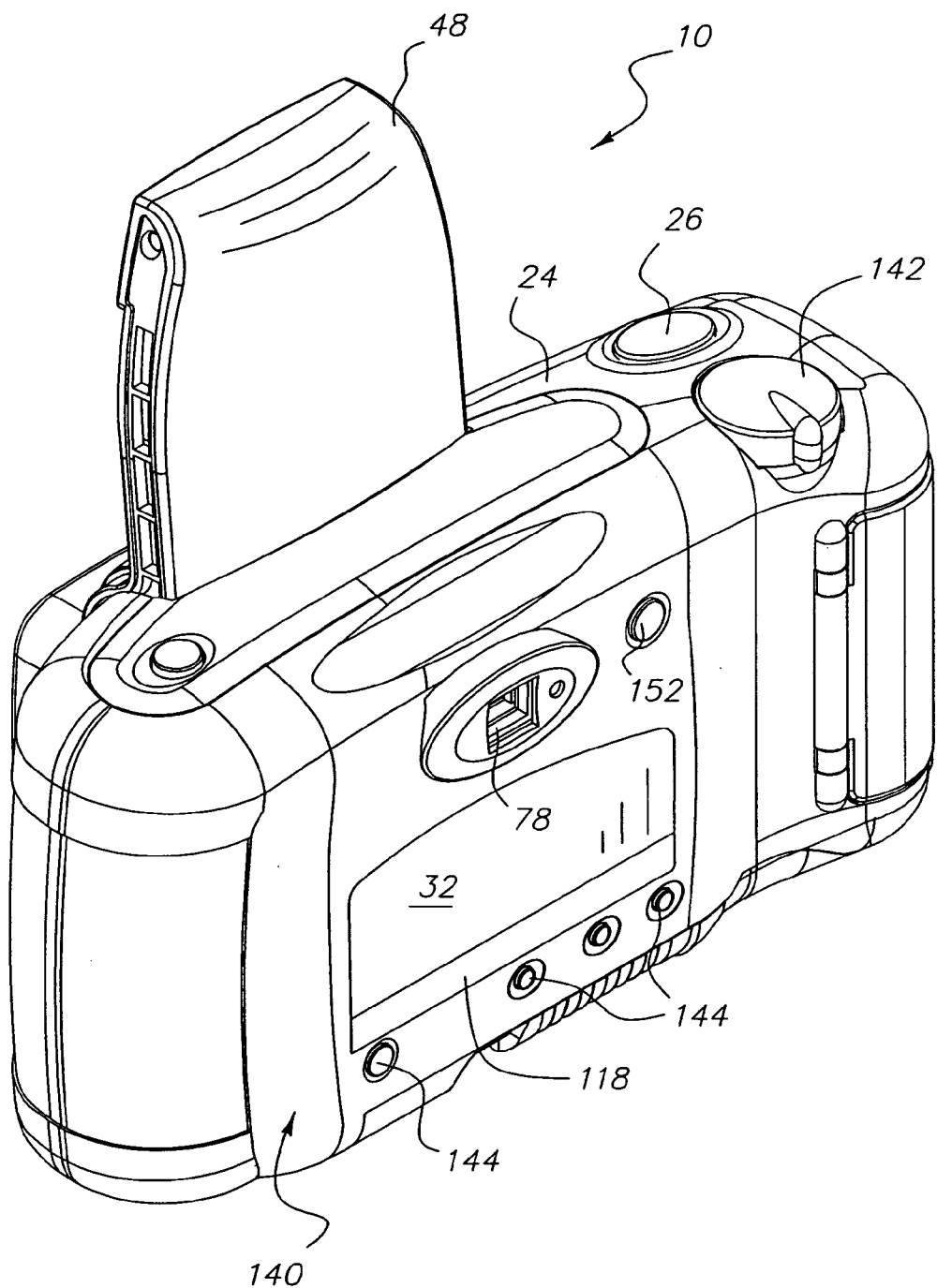
FIG. 3 is a perspective view of the camera of FIG. 2.
Figure 4:
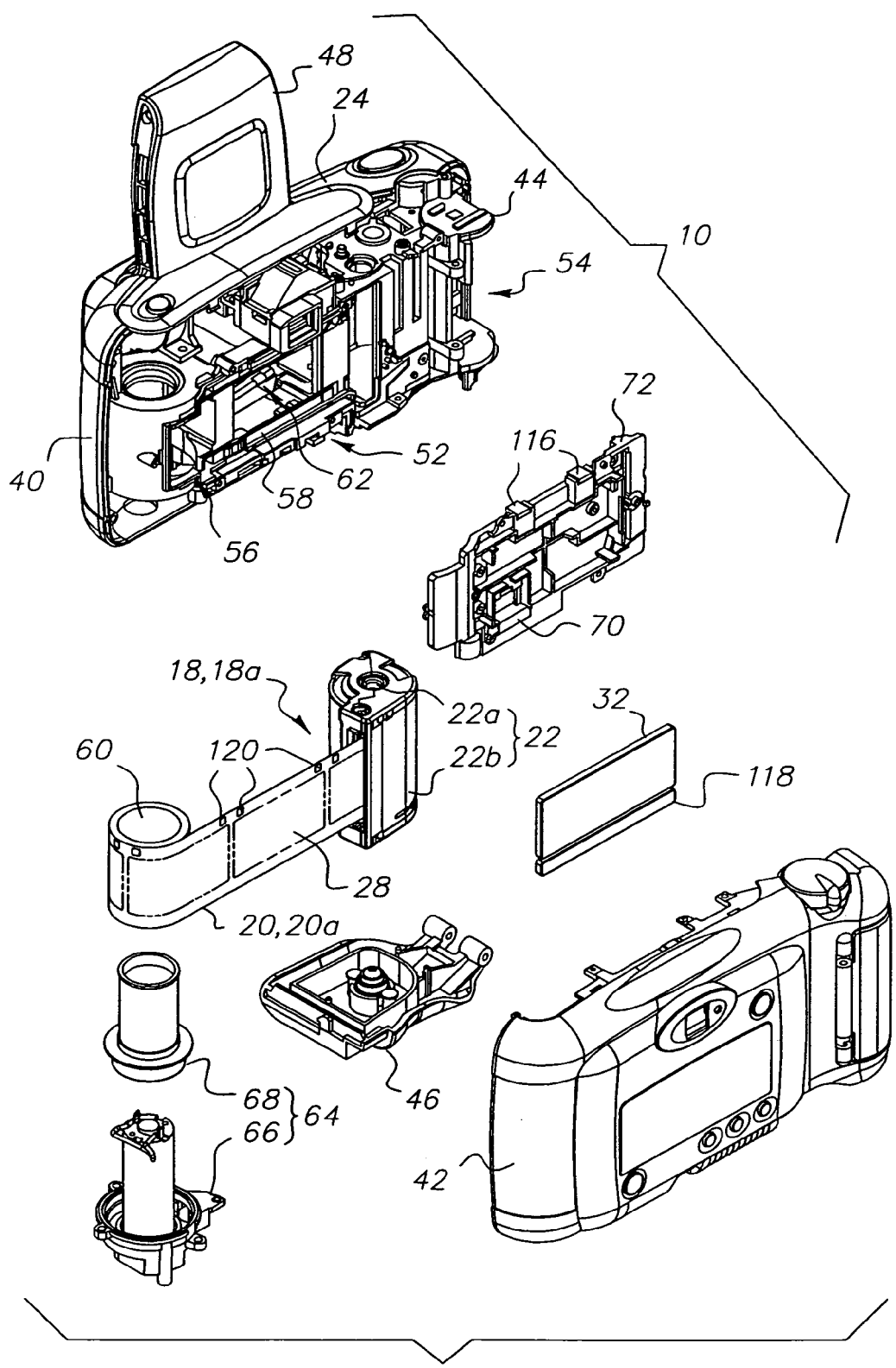
FIG. 4 is an exploded perspective view of the camera of FIG. 2.

The camera 10 shown in FIGS. 3–4 is reloadable and has motorized film transport. The camera 10 uses an Advanced Photo System ("APS") film cartridge. Other types of one or two chamber film cartridge could also be used and roll film can also be used. It is currently preferred that the camera 10 is reloadable. The camera 10 can have a IX-DX code reader 67 to determine the film type and number of film frames.

The APS filmstrip 20a has a transparent magnetic overlay (not illustrated) which gives it a magnetic recording capacity to store various metadata such as number of prints ordered and print aspect ratio, along a magnetic information track adjacent each exposed film frame 28. The filmstrip 20a is normally housed in an opaque film cartridge and is typically available in 15-exposure, 25-exposure, and 40-exposure lengths. Metadata, including user-selected information, can differ from frame-to-frame. The camera 10 has a data recorder 70 positioned adjoining the filmstrip 20a to record the metadata. FIGS. 3–4 illustrate an APS camera 10 with a data recorder 70 in the form of a magnetic head mounted within an opening in a film pressure platen 72 for magnetically recording the metadata along the magnetic information track adjacent each one of the exposed film frames 28, when the exposed film length is advanced out of the film cartridge. The film pressure platen 72 serves to support each film frame 28 flat for exposure at the exposure frame 58.

The cameras 10 herein are not limited to APS film units nor to recording metadata on a magnetic layer. Optical recording of metadata by cameras is well known in the art, as are other means of storing such information such as use of memory media attached to a film canister. Information including the kinds of metadata provided by APS cameras and films, can be written, or read, or both by any means well known to those of skill in the art.

Frames 28 of the filmstrip 20a are temporarily positioned, one at a time, in the exposure frame 58, for archival image exposure. The film roll spool 68 is incrementally rotated following each film frame exposure, to wind the most-recently exposed one of the film frames 28 onto an exposed film roll 60 on the spool 68 and to position a fresh unexposed film frame 28 at the exposure frame 58. When the film roll spool 68 is incrementally rotated by the film transport 64, the filmstrip 20a is advanced forward one frame increment (which is slightly greater than a frame width) from the film cartridge. Film transport is controlled by the controller 36. When substantially the entire length of the filmstrip 20a is exposed, i.e. the total number of available frames 28 are exposed, a spindle (not shown) which projects into a cavity in a top end of a film spool 22a inside the film cartridge is continuously rotated by the film drive 64 using a suitable gear train (not shown) to rewind the exposed film length rearward into the film cartridge.

To magnetically record user-selected information as metadata on the filmstrip 20a, the magnetic track or tracks on the filmstrip 20a are moved past the data recorder 70 at an appropriate speed while a field is generated in a recording head (not shown) of the recorder 70. The recording can be done stepwise, moving the filmstrip 20a in increments for each film frame 28 or the data can be stored in memory in the camera 10 until all film exposures are completed, then all the data can be recorded in a single continuous pass. When all film exposures are completed and metadata has been recorded and the filmstrip 20a is light-tightly closed in the film canister 22b, the film unit 18 can be removed from the camera 10 by opening the film door 46.

The electronic image capture unit 16 has an electronic array imager 30 driven by an imager driver 74. The electronic array imager 30 is configured so as to capture, for each picture-taking event, one or more electronic images that correspond to a latent image concurrently captured on the filmstrip 20a. The type of imager 30 used may vary, but it is highly preferred that the imager 30 be one of the several solid-state imagers available.

One highly popular type of solid-state imager commonly used is the charge coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imager has both advantages and disadvantages, but all will work in this application. A typical CCD has separate components that act as clock drivers, analog signal processor-analog/digital converter (also referred to as "A/D converter 114").

It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, the A/D converter 114, and other components integrated on a single IC. A third type of sensor which can be used is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit 16 captures a three-color image. It is highly preferred that a single imager be used along with a three-color or four color filter, however, multiple monochromatic imagers and filters can be used. Suitable three-color filters are well known to those of skill in the art, and are normally incorporated with the imager to provide an integral component. For convenience, the camera 10 is generally discussed herein in relation to embodiments having a single imager 30 with a three color filter (not separately illustrated). It will be understood that like considerations apply to cameras using more than three colors as well as cameras using multiple monochromatic imagers.

Figure 2A:
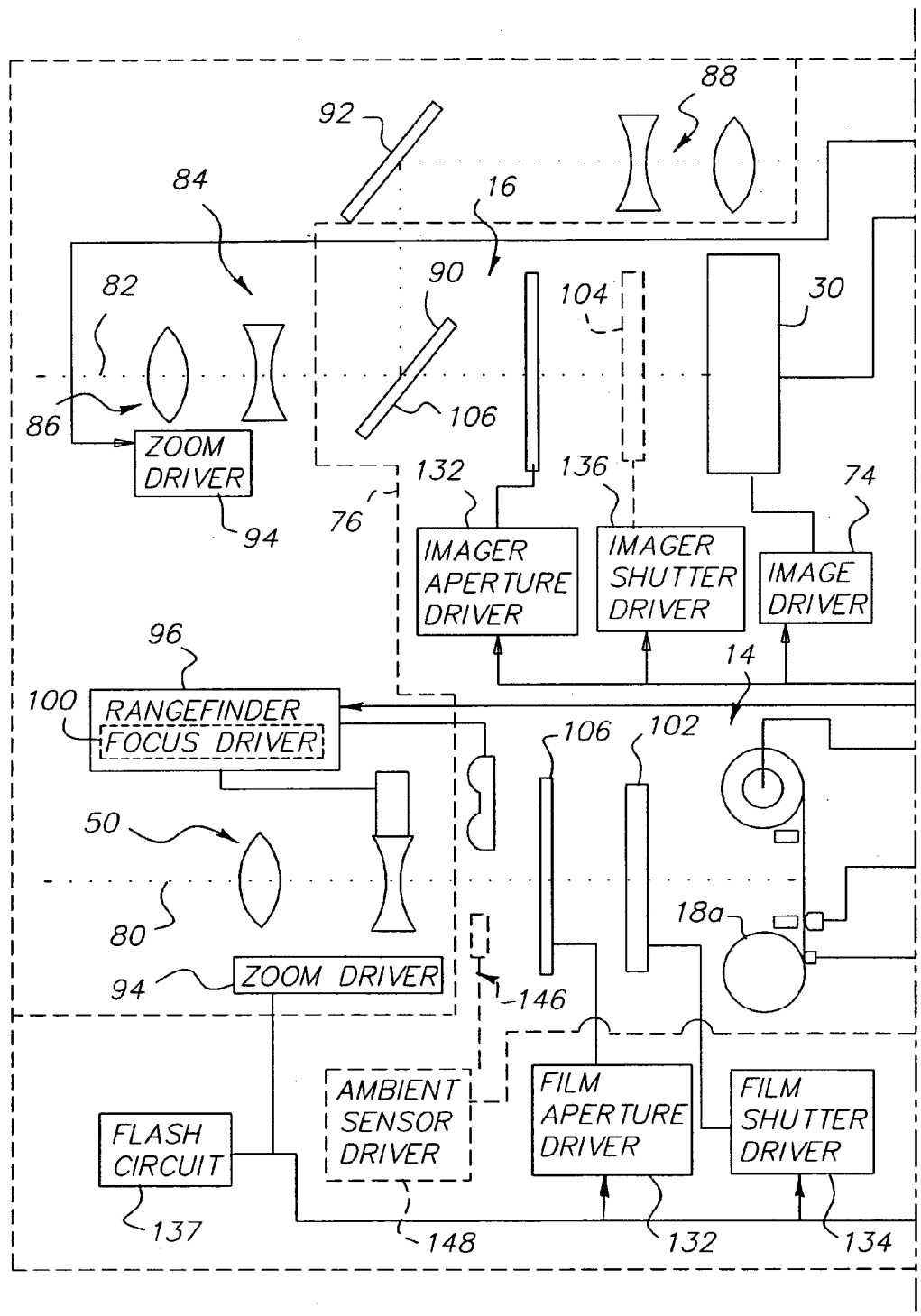
FIGS. 2–2B present a schematic diagram of an embodiment of the camera.
Figure 2B:
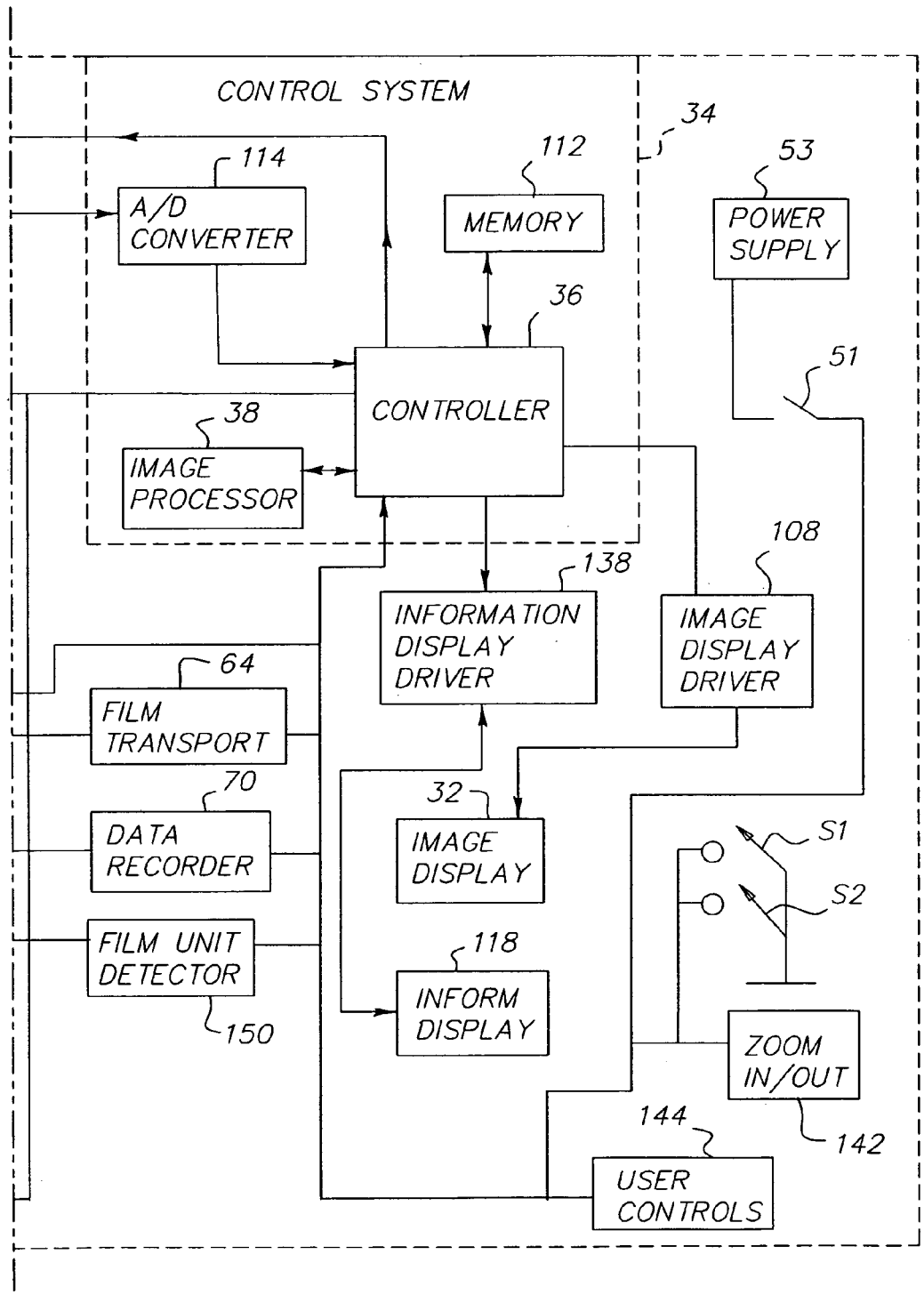

Referring now primarily to FIG. 2, the camera 10 has a optical system 76 of one or more lenses mounted in the body 24. The optical system 76 is illustrated by a dashed line and several groups of lens elements. It will be understood that this is illustrative, not limiting. The optical system 76 directs light to the exposure frame 58 and to the electronic array imager 30. The optical system 76 also preferably directs light through an optical viewfinder 78 to the user.

The imager 30 is spaced from the exposure frame 58, thus, the optical system 76 directs light along a first path (indicated by a dotted line 80) to the exposure frame 58 and along a second path (indicated by a dotted line 82) to the electronic array imager 30. Both paths 80,82 converge at a position in front of the camera 10, at the plane of the subject image. In FIG. 2, the optical system 76 has a combined lens unit 84 that includes both an imager lens unit 86 and a viewfinder lens unit 88. The combined lens unit 84 has a partially transmissive mirror 90 that subdivides the second light path 82 between an imager subpath to the imager 30 and a viewfinder subpath that is redirected by a fully reflective mirror 92 and transmitted through an eyepiece to the photographer.

The optical system 76 can be varied. For example, the viewfinder lens unit 88, imager lens unit 86, and a taking lens unit 50 can be fully separate (not shown) or a combined lens unit 84 can include both a taking lens unit 50 and an imager lens unit 86 (not shown). Other alternative optical systems can also be provided.

In most cameras 10, there is a variation between the field of view of the viewfinder 78 and the field of view of the archival image capture unit 14. The scene delineated by the viewfinder 78 is typically 80 to 95 percent of the field of view of the archival image capture unit 14. The difference ensures that everything the photographer sees will be captured in the archival image, albeit with some additional image content at the edges. Cameras 10 are generally described and illustrated herein in terms of viewfinder that have a 100 percent match to the field of view of the archival image capture unit. This is a matter of convenience in describing the invention. The viewfinders 78 of the cameras 10 can be limited to 80 to 95 percent of the field of view of the archival image capture unit 14 without changing the other features described.

Referring again to the embodiment shown in FIG. 2, the taking lens unit 50 is a motorized zoom lens in which a mobile element or elements are driven, relative to a stationary element or elements, by a zoom driver 94. The combined lens unit 84 also has a mobile element or elements, driven, relative to a stationary element or elements, by a zoom driver 94. The different zoom drivers 94 are coupled so as to zoom together, either mechanically (not shown) or by a control system 34 signaling the zoom drivers 94 to move the zoom elements of the units over the same or comparable ranges of focal lengths at the same time.

The control system 34, which includes a controller 36, can take the form of an appropriately configured microcomputer, such as an embedded microprocessor having RAM or other memory for data manipulation and general program execution.

The taking lens unit 50 of the embodiment of FIG. 2 is also autofocusing. An autofocusing system has a rangefinder 96 that includes a sensor 98. The rangefinder 96 operates a focus driver 100, directly or through the control system 34, to move one or more focusable elements (not separately illustrated) of the taking lens unit 50. The rangefinder 96 can be passive or active or a combination of the two.

The taking lens unit 50 can be simple, such as having a single focal length and manual focusing or a fixed focus, but this is not preferred. One or both of the viewfinder lens unit 88 and imager lens unit 86 can have a fixed focal length or one or both can zoom between different focal lengths. Digital zooming (enlargement of a digital image equivalent to optical zooming) can also be used instead of or in combination with optical zooming for the imager 30. The imager 30 and image display 32 can be used as a viewfinder 78 prior to image capture in place of or in combination with the optical viewfinder 78, as is commonly done with digital still cameras 10. This approach is not currently preferred, since battery usage is greatly increased.

Although the camera 10 can be used in other manners, the archival image is intended to provide the basis of the photofinished or other final image desired by the user. The derived images thus do not have to have the same quality as the archival image. As a result, the imager 30 and the portion of the optical system 76 directing light to the imager 30 can be made smaller, simpler, and lighter. For example, the taking lens unit can be focusable and the imager lens unit 86 can have a fixed focus or can focus over a different range or between a smaller number of focus positions.

A film shutter 102 shutters 102,104 the light path to the exposure frame 58. An imager shutter 104 shutters 102,104 the light path to the imager 30. Diaphragms/aperture plates 106 can also be provided in both of the paths 80,82. Each of the shutters 102,104 is switchable between an open state and a closed state. The term "shutter" is used in a broad sense to refer to physical and/or logical elements that provide the function of allowing the passage of light along a light path to a filmstrip 20a or imager 30 for image capture and disallowing that passage at other times. "Shutter" is thus inclusive of, but not limited to, mechanical and electromechanical shutters of all types. "Shutter" is not inclusive of film transports and like mechanisms that simply move film or an imager 30 in and out of the light path. "Shutter" is inclusive of computer software and hardware features of electronic array imagers that allow an imaging operation to be started and stopped under control of the camera controller 36.

In currently preferred embodiments, the film shutter 102 is mechanical or electromechanical and the imager shutter 104 is mechanical or electronic. The imager shutter 104 is illustrated by dashed lines to indicate both the position of a mechanical imager shutter and the function of an electronic shutter. When using a CCD, electronic shuttering of the imager 30 can be provided by shifting the accumulated charge under a light shielded register provided at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array.

CMOS imagers are commonly shuttered by a method called a rolling shutter. CMOS imagers using this method are not preferred, since this shutters each individual line to a common shutter time, but the exposure time for each line begins sequentially. This means that even with a short exposure time, moving objects will be distorted. Given horizontal motion, vertical features will image diagonally due to the temporal differences in the line-by-line exposure. Another method for shuttering CMOS imagers is described in U.S. Pat. No. 5,986,297. In this method, called single frame capture mode, all pixels are allowed to integrate charge during the exposure time. At the end of the exposure time, all pixels are simultaneously transferred to the floating diffusion of the device. At this point sequential read out by lines is possible.

An image display 32 is mounted on the outside of the body 24 and, preferably, faces the rear of the camera 10. The image display 32 is driven by an image display driver 108 and can be turned on to display a verification image to preview what a print or other final image is expected to look like. Signal lines 110 electronically connect the imager 30 through the control system 34 to the image display 32. The image display 32 produces a light image (also referred to here as a "display image") that is viewed by the user.

The control system 34, as earlier discussed, includes the controller 36 and memory 112 and also includes an analog-digital converter 114 (also referred to herein as a "A/D converter 114") (this term is inclusive of components that also include an analog signal processor and amplifier) and the image processor 38. Other components can also be provided, as discussed below, in detail. Suitable components for the control system 34 are known to those of skill in the art. Modifications of the control system 34 are practical, such as those described elsewhere herein. The controller 36 can be provided as a single component, such as a microcomputer or microprocessor, or as multiple components of equivalent function in distributed locations. The same considerations apply to the processor and other components. Likewise, components illustrated as separate units herein may be conveniently combined or shared in some embodiments.

The captured analog electronic image is amplified and converted by the A/D converter 114 to a digital electronic image, which is then processed in the image processor 38 and stored in the memory 112.

"Memory 112" refers to one or more suitably sized logical units of physical memory provided in semiconductor memory or magnetic memory, or the like. For example, the memory can be an internal memory, such as a Flash EPROM memory, or alternately a removable memory, such as a CompactFlash card, or a combination of both. "Memory 112", as used herein, is separate from the "film unit 18". Thus, in some embodiments, the camera has both memory 112 and a digital film unit 18.

It is currently preferred that the signal lines 110 act as a data bus connecting the imager 30, controller 36, processor 38, the image display 32, and other electronic components.

The controller 36 and image processor 38 can be controlled by software stored in the same physical memory 112 that is used for image storage, but it is preferred that the processor 38 and controller 36 are controlled by firmware stored in dedicated memory (not separately illustrated), for example, in a ROM or EPROM firmware memory. Separate dedicated units of memory can also be provided to support other functions.

The respective electronic images correspond to the latent images on the exposed film frames 28, and, after processing, are individually stored in memory 112, each time the filmstrip 20a is advanced forward one frame increment following a film exposure. The memory 112 has a successive-image storage capacity for a limited number of electronic images. For convenience, the electronic images stored in a single camera 10 are generally treated herein as all being of the same size or about the same size. This is the case in currently preferred embodiments; but is not limiting.

The embodiment shown in the figures has space for storing up to 50 captured electronic images. This number is exceeds the maximum number of latent images on currently available APS film units, which is 40. When a latent image is exposed, the filmstrip 20a is advanced a frame increment. This is detected by one or more sensors 116 which signal the controller. In response, the controller 36 decrements a frame count (the number of film frames 28 available on the filmstrip 20a that remain to be exposed) stored in memory 112 by one. The frame count can go forward from zero or backward from 15, 25, or 40 depending on whether the filmstrip 20a has a 15-exposure, 25-exposure, or 40-exposure length. The current frame count is shown in an information display 118. In the camera shown in FIGS. 3–4, a pair of identical film perforation sensors 116 for sensing successive pairs of film perforations 120 in the filmstrip 20a are mounted in respective pockets in the film pressure platen 72 and are connected to the controller.

The manner in which electronic images are stored in memory 112 is not critical. For convenience, the storing of electronic images is discussed herein in terms of allocated separate single-image addresses or blocks "1" to "50" in the memory 112. Consistent with the frame count, respective frame numbers for the captured electronic images are stored at the single-image addresses "1" to "50" in the memory 112. The respective electronic images stored in the memory 112 at the single-image addresses can be accessed separately and shown individually on the image display 32.

The camera 10 has a communications port 124, through which the electronic images stored in memory 112 can be downloaded under the control of the controller 36 to a imaging device 126 (illustrated as a computer, and only in FIG. 1) such as a computer or network or digital appliance, using a communications protocol, such as the USB protocol. The camera 10 can optionally provide for downloading of individual electronic images; however, is currently preferred that all images in memory 112 be downloaded at each download event. The reason this approach is preferred, is that, in preferred embodiments, the size of the electronic images is relatively small and download times are relatively quick; and, with this in mind, it is better for the user to download all images, then discard any that are not desired, rather than present the risk that wanted images will not be downloaded or increase the time necessary to download images by increasing the number steps required.

The controller 36 facilitates the transfers of the image, along the signal lines 110, between the electronic components and provides other control functions, as necessary. The controller 36 includes a timing generation circuit (not separately illustrated) that produces control signals for all electronic components in timing relationship.

Calibration values for the individual camera 10 are stored in a calibration memory (not separately illustrated), such as an EEPROM, and supplied to the controller 36. The controller 36 operates the memory 112 or memories and the drivers including the zoom drivers 94, focus driver 130, imager driver 74, image display driver 108, aperture drivers 132, and film and imager shutter drivers 134,136. The controller 36 connects to a flash circuit 137 of the flash unit that mediates flash functions.

It will be understood that the circuits shown and described can be modified in a variety of ways well known to those of skill in the art. It will also be understood that the various features described here in terms of physical circuits can be alternatively provided as firmware or software functions or a combination of the two. The controller 36 is illustrated as a single component, but it will be understood that this is a matter of convenience in illustration. The controller 36 can be provided as multiple components of equivalent function in distributed locations. The same considerations apply to the processor 38 and other components. Likewise, components illustrated as separate units herein may be conveniently combined or shared in some embodiments.

The digital electronic image stored in memory 112, is accessed by the processor 38 and is modified so as to provide a required derived image. As a part of showing a derived image on the image display 32, the camera 10 may modify the derived image for calibration to the characteristics of the particular display. For example, a transform can be provided that modifies each image to accommodate the different capabilities in terms of gray scale, color gamut, and white point of the display and the imager and other components of the electronic capture unit. It is preferred that the display is selected so as to permit all of the verification image to be shown; however, more limited displays can be used. In the latter case, the displaying of the verification image includes calibration that cuts out part of the image, or contrast levels, or some other part of the information in the verification image.

The derived images can also be modified in the same manner that images are enhanced in fully digital cameras. For example, processing can provide interpolation and edge enhancement. A limitation here is that the derived images are intended to correspond to photofinished archival images and, thus, enhancements should limited so as to not render the derived image dissimilar to the corresponding photofinished archival image. If the archival image is an electronic image, then comparable enhancements can be provided for both verification and archival images. Digital processing of an electronic archival image can also include modifications related to file transfer, such as, JPEG compression, and file formatting.

Enhancements can be provided to match the calibrated derived image to output characteristics of a selected photofinishing channel. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to select a photofinishing choice, for example by entering a character on a control pad or setting a switch. This designation can then direct the usage of particular photofinishing options and can provide for a direct or indirect indication of the effect in a derived image. The application of a designation on a capture media unit could be provided by a number of means known to those in the art, such as application of a magnetic or optical code.

Derived images can be prepared from the electronic image before being needed or as needed, as desired, subject to the limitations of processing speed and available memory. To minimize the size of the memory 112, an electronic image can be processed and stored as a lower resolution image, before a succeeding image is read out from the imager 30.

Different types of image display 32 can be used. For example, the image display 32 can be a liquid crystal display ("LCD"), a cathode ray tube display, or an organic electroluminescent display ("OELD"; also referred to as an organic light emitting display, "OLED").

The image display 32 is preferably mounted on the back or top of the body 24, so as to be readily viewable by the photographer immediately following a picture taking. One or more information displays 118 can be provided on the body 24, to present camera information to the photographer, such as exposures remaining, battery state, printing format (such as C, H, or P), flash state, number of prints ordered, and the like. For convenience, the information display 118 is generally discussed here in the singular. The information display 118 and image display 32 can be provided by separate display devices or both be provided by contiguous parts of a common display device. The information display 118 can be deleted if information is instead provided on the image display 32 as a superimposition on the image or alternately instead of the image (not illustrated). If separate, the information display 118 is operated by an information display driver 138.

In the embodiment shown in FIGS. 3–4, the image display 32 is mounted to the back of the body 24 and the information display 118 is mounted to the body 24 adjacent to the image display 32 such that the two displays 32,118 form part of a single user interface 140 that can be viewed by the photographer in a single glance. The image display 32 and an information display 118 can be mounted instead or additionally so as to be viewable through the viewfinder 78 as a virtual display (not shown).

It is preferred that the image display 32 is operated on demand by actuation of a switch (not separately illustrated). The image display 32 is turned off by again actuating the switch or by initial depression of the shutter release 26. The image display 32 can also be automatically turned off by a timer for battery conservation. The timer can be provided as a function of the controller 36. When the image display 32 is actuated, earlier captured images can be reviewed using a user control 144 to sequence through the images.

Referring now particularly to FIGS. 3–4, the user interface 140 of the camera 10 includes the shutter release 26, the "zoom in/out" toggle 142 that controls the zooming of the lens units, and other user controls 144 along with the image display 32 and the information display 118. The shutter release 26 operates both shutters 102,104. To take a picture, the shutter release 26 is actuated by the user and trips from a set state to an intermediate state, and then to a released state. The shutter release 26 is typically actuated by pushing, and, for convenience the shutter release 26 is generally described herein in relation to a shutter button that is initially depressed through a "first stroke", to actuate a first switch S1 and alter the shutter release 26 from the set state to the intermediate state and is further depressed through a "second stroke", to actuate a second switch S2 and alter the shutter release 26 from the intermediate state to the released state. Like other two stroke shutter releases well known in the art, the first stroke actuates exposure-delimiting camera components, such as autofocus, autoexposure, and flash unit readying; and the second stroke actuates capture of the archival image.

Referring now to FIG. 2, when the shutter release 26 is pressed to the first stroke, the taking lens unit 50 and combined lens unit 84 are each autofocused to a detected subject distance based on subject distance data sent by the rangefinder 96 to the controller 36. The controller 36 also receives data indicating what focal length the lens units 50,84 are set at from one or both of the zoom drivers or a zoom sensor (not shown). The camera 10 also detects the film speed of the film cartridge 18a loaded into the camera 10 using the reader 67 and relays this information to the controller 36. The camera 10 obtains scene brightness (Bv) from components, discussed below, that function as a light meter. The scene brightness and other exposure parameters are provided to an algorithm in the controller 36, which determines a focused distance, shutter speeds, apertures, and optionally a gain setting for amplification of the analog signal provided by the imager 30. Appropriate signals for these values are sent to the drivers via a motor driver interface (not shown) of the controller 36. The gain setting is sent to the A/D converter 114.

The camera 10 assesses ambient lighting using the imager 30 or a separate detector 146 (indicated by dashed lines in FIG. 2) or both. The detector 146 has an ambient detector driver 148 that operates a single sensor or multiple sensors (not shown). In some embodiments, the evaluation image capture unit 16 is used to assess ambient lighting. In those embodiments, one or more electronic images are captured prior to capture of the archival image. The captured electronic image data from one or more of these preliminary images is sampled and scene parameters, such as automatic setting of shutter speeds and diaphragm settings, are determined from that data. These preliminary electronic images can be captured in a continuing sequence as long as the capture system 12 is in a preliminary mode. For example, preliminary images can be captured, seratim, as long as the shutter release 26 is actuated through the first stroke and is maintained in that position. This capture of preliminary images ends when the shutter release 26 is returned to a stand-by position or is actuated through the second stroke for archival image capture. The preliminary electronic images could be saved to memory 112; but, except as otherwise described here, are ordinarily discarded, one after another, when the replacement electronic image is captured to reduce memory 112 usage. The preliminary images can also be provided to the image display 32 for use by the photographer, prior to picture taking, in composing the picture. This use of the image display 32 as an electronic viewfinder 78 greatly increases energy usage and is not preferred for that reason.

The electronic capture unit is calibrated during assembly, to provide measures of illumination, using known values. For example, the controller 36 can process the data presented in a preliminary image using the same kinds of light metering algorithms as are used for multiple spot light meters. The procedure is repeated for each succeeding preliminary image. Individual pixels or groups of pixels take the place of the individual sensors used in the multiple spot light meters. For example, the controller 36 can determine a peak illumination intensity for the image by comparing pixel to pixel until a maximum is found. Similarly, the controller 36 can determine an overall intensity that is an arithmetic average of all of the pixels of the image. Many of the metering algorithms provide an average or integrated value over only a selected area of the imager 30 array, such as an upper middle region. Another approach is to evaluate multiple areas and weigh the areas differently to provide an overall value. For example, in a center weighted system, center pixels are weighted more than peripheral pixels. The camera 10 can provide manual switching between different approaches, such as center weighted and spot metering. The camera 10 can alternatively, automatically choose a metering approach based on an evaluation of scene content. For example, an image having a broad horizontal bright area at the top can be interpreted as sky and given a particular weight relative to the remainder of the image.

Under moderate lighting conditions the imager 30 can provide light metering and color balance determination from a single preliminary image. More extreme lighting conditions can be accommodated by use of more than one member of the series of preliminary electronic images while varying exposure parameters until an acceptable electronic image has been captured. The manner in which the parameters are varied is not critical.

After the controller 36 receives the scene brightness value, the controller 36 compares scene brightness to a flash trip point. If the light level is lower than the flash trip point, then the controller 36 enables full illumination by the flash unit 48, unless the user manually turned the flash off. Appropriate algorithms and features for these approaches are well known to those of skill in the art.

A second switch S2 actuates when the shutter release 26 is further pushed to a second stroke. When the second switch S2 actuates, the film shutter 102 is tripped and the capture of the latent image exposure on the film frame 28 begins. The film shutter 102 momentarily opens for a duration referred to herein as a "archival image exposure time interval". The imager shutter 104 is also actuated and momentarily opens during the archival image exposure time interval to capture the initial electronic image.

When a film unit 18 is to be removed from the camera 10, the film door 46 is opened and the film unit 18 is extracted. The camera 10 has a film unit detector or signaler 150, which signals the controller 36 when a film unit 18 is present and the film door 46 has been closed. In response, the controller 36 can cause the information display 118 to show and icon or other indicia (not illustrated) that indicates whether or not a film unit 18 is loaded and the film door is shut.

The image display 32 can be used to verify the quality of a just captured image and can also be used to review earlier captured images. User controls 144 are provided for these functions. In the camera 10 shown in the figures, a verification image of the last captured archival image is accessed by pressing a verify button 152. This activates the image display 32 and disables image capture while the image display 32 is actuated. The user can change from a the last captured image to earlier captured images by sequencing through the images using the respective user control (not separately illustrated) In a particular embodiment, the zoom toggle 142 is used for this function when the image display is activated. Some features of final images produced from the archival images can be modified while the verification images are viewed, as discussed below in detail.

In the embodiments in the figures, it is highly preferred that the camera memory 112 has sufficient capacity to store an electronic image corresponding to each of the film frames 28 of the film unit 18, since this allows the user to review all of the images of a film unit 18 at one time. Since the film units 18 come in different capacities, the memory 112 needs sufficient capacity to store an electronic image corresponding to each of the film frames 28 of a film unit 18 having the largest capacity. This provides excess capacity in memory 112 when smaller capacity film units 18 are used. It is preferred that the memory 112 of the camera 10 has sufficient capacity to provide some excess over even the largest capacity film unit 18.

The excess memory capacity can be used to allow the user to review electronic images corresponding to archival images of earlier used film units 18. The captured electronic images corresponding to the latent images in the film units 18 are not erased from memory 112 when the respective film unit 18 is removed from the camera 10; instead, once the memory 112 is full, the oldest captured electronic image is overwritten by the newest captured electronic image. (If necessary, two old electronic images may be deleted if required to free enough memory 112 to store one new image). The order in which the images are replaced, first in-first-out, corresponds to many practices in inventory control and the like and is also referred to herein by the term "FIFO".

Since the memory 112 is large enough to hold more than electronic images from more than one roll of film, the memory 112 therefore holds two types of electronic images: current electronic images corresponding to the latent images on the exposed frames 28 of the film unit 18 currently loaded in the camera 10, and past electronic images corresponding to the latent images on the exposed frames 28 of one or more film units 18 earlier exposed in the camera 10. By storing both current images and past images, the user can always view or download a last series of electronic images, within the limits of storage capacity, even if they removed a first film unit and started a second film unit.

Selective Image Exclusion from First In-first Out Electronic Image Overwriting

Referring now particularly to FIGS. 1, 5, and 7–9, electronic images are available for downloading from the memory 112 of the camera 10, only if the electronic images have not yet been overwritten. This presents a problem if the user wants to download a few images, but uses several film units before downloading the electronic images. The automatic FIFO image replacement routine, above-described, will replace some or all of such electronic images before the images can be downloaded. This effect of the FIFO deletion cycle can be overcome by increasing the size of the memory 112 in the camera 10, but this approach adds cost and only delays the onset of the same problem.

A better solution is for the user to selectively assign save tags (also referred to herein simply as "tags") to selected images in the memory 112 of the camera 10. The resulting tagged images are withdrawn from automatic FIFO replacement. Untagged images remain subject to FIFO replacement.

Figure 5:
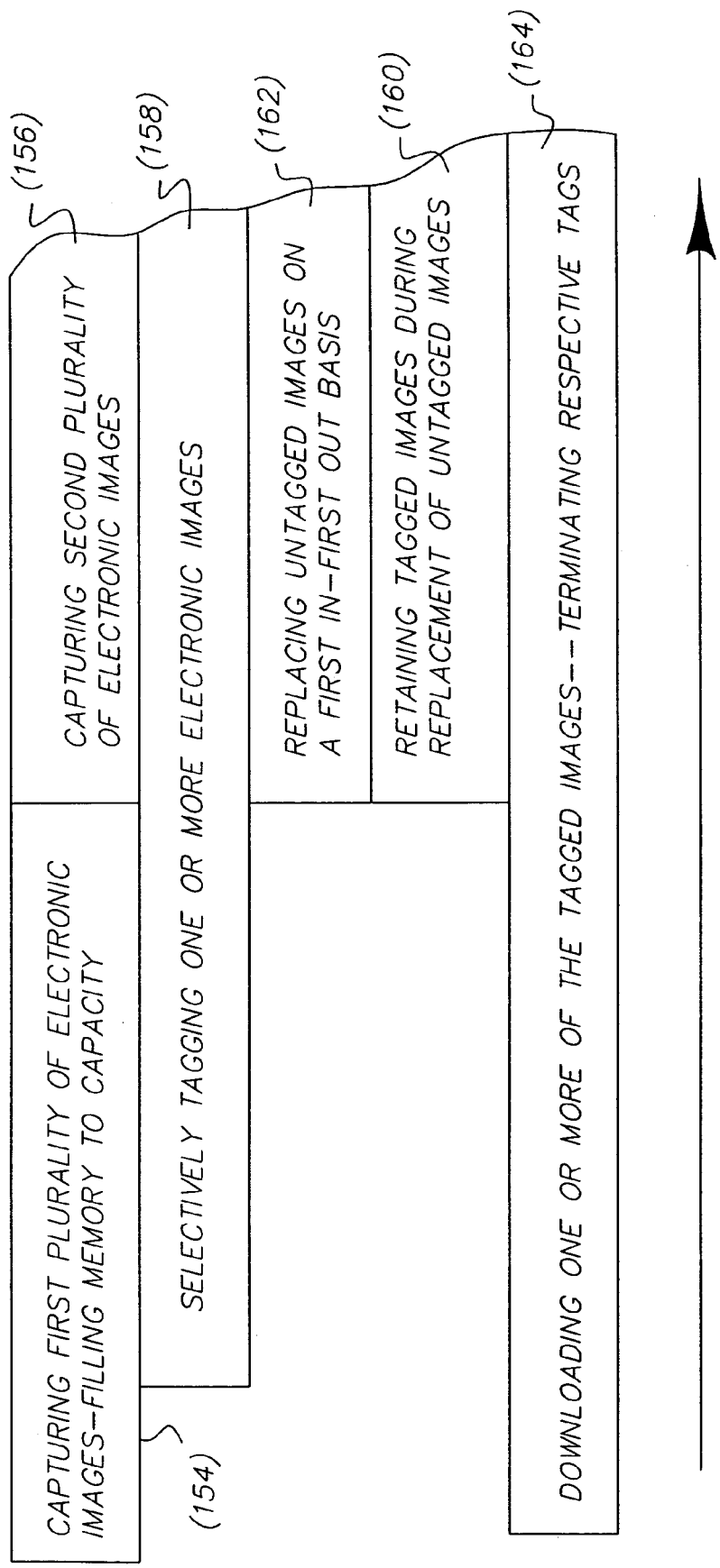
FIG. 5 is a diagram of the method for selectively excluding images from first in-first out electronic image overwriting. Time extends along the x-axis from left to right. Units are arbitrary and steps are cut-off at the right end of the diagram. Each step of the method takes place within the indicated block of time, but not necessarily for the entire block of time.

Referring now to FIG. 5, a first plurality of electronic images are captured (154). This group of images is sufficient to fill than the memory 112 of the camera 10 to capacity. A second plurality of electronic images are then captured (156). Following capture of the first image (indicated by an indent to the right) and at any time after that during the course of the capture (154,156) of the electronic images of the first or second plurality, the user can assign (158) tags to selected images.

After electronic images in memory 112 are tagged, those images are retained (160) until terminated during the FIFO replacement (162) of untagged images. The tags stay until terminated automatically when the respective electronic image is downloaded (164) from the camera 10. The user also has the option of selectively terminating (not illustrated in FIG. 5) individual tags, at any time after tagging. In a particular embodiment, tagged images are also terminated (not illustrated) by expiration of a time period, such as one year from the date of capture or six months from the date of tagging.

In any case, the termination of tags is unrelated to FIFO image replacement and independent of capture of new images. Once the tag is removed the resulting untagged electronic image is not immediately erased from the memory 112, but rather enters the FIFO queue of untagged images in date and time order. Each untagged image is eventually overwritten when it becomes the oldest untagged image and space is needed for a new electronic image.

As FIG. 5 illustrates, the capturing of electronic images (154,156), tagging (158), and terminating (164) of tags can all occur during the same general time period. As a result the number of electronic images in the first plurality, that is, the number of electronic images that can be captured before memory 112 is filled to capacity can go up and down, as electronic images are tagged and untagged. It is desirable to retain memory space for an electronic image corresponding to each frame of a currently loaded film unit 18. This can be accomplished by limiting the number of electronic images that can be tagged as saved images, to a fixed number; so that there is always enough memory 112 remaining to store in memory 112 all electronic images corresponding to exposed frames 28 on the current film unit 18 without overwriting any tagged images. For example, tagged images may be limited to 10, so that all images on a 40 exposure film unit can be saved in a memory 112 with 50 blocks. In this case, the maximum number of untagged electronic images stored in memory 112, is 50 less the number of tagged images at any given time, which is between 0 and 10. Thus, the maximum number of saved, untagged images remains between 40 and 50. If a 25 exposure film unit is used, then the number of tagged images available is still 10 and the number of untagged images is still between 40 and 50; however, there is memory space for all of the images in the current film unit along with some images from a preceding film unit.

Figure 7:
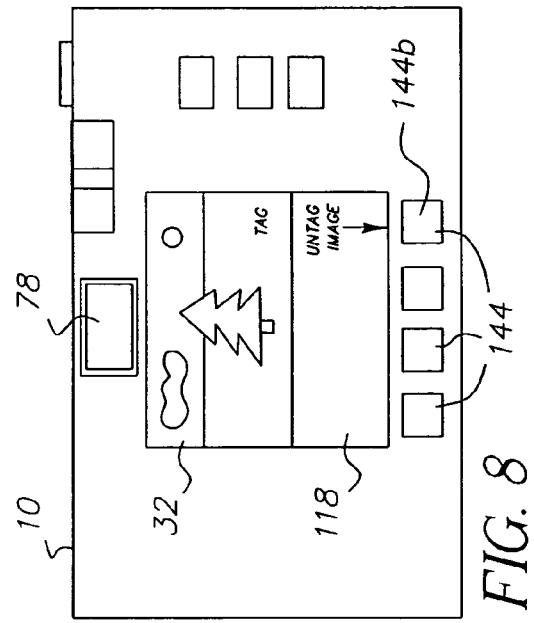
FIG. 7 is a semi-diagrammatical rear plan view of another embodiment of the camera, showing an untagged verification image. The camera has one or more tags available.
Figure 8:
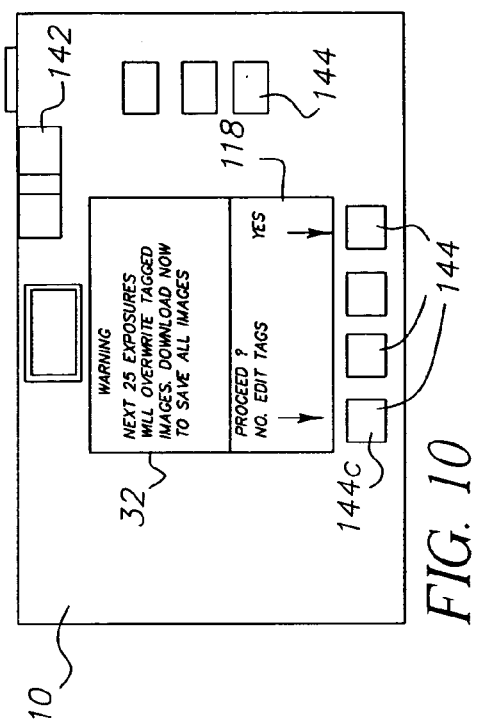
FIG. 8 is the same view as in FIG. 7, but shows a tagged image.
Figure 9:
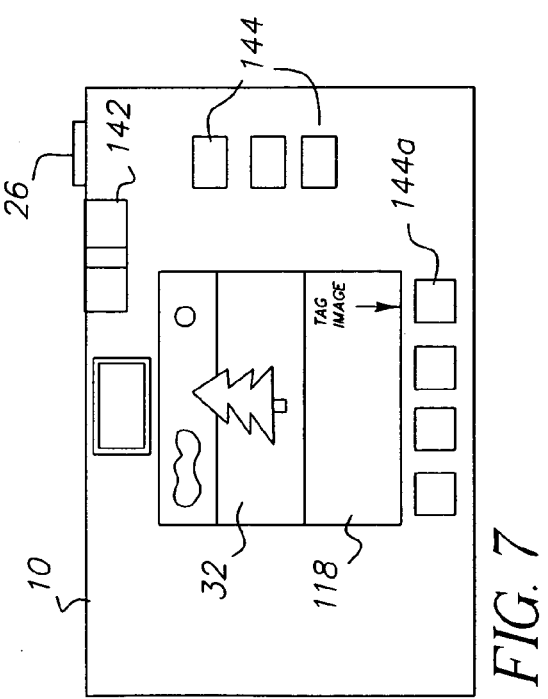
FIG. 9 is the same view as in FIG. 7 and shows an untagged image, but the camera has no available tags.

The tags are assigned or unassigned by actuating a tag selector 166 while the respective electronic image is displayed on the image display 32. The tag selector 166 can be a dedicated or shared control button 144 or the like that is pressed to tag or untag the displayed electronic image. FIGS. 7–9 illustrate a user control 144 provided by designation of a button 144a using the information display 118. In FIG. 7 a verification image derived from a respective electronic image is shown on the image display. The particular electronic image is untagged and tags are available for use. The controller causes the information display to designate a particular user control 144 that can be actuated to tag the image. In FIG. 8 the verification image is that of a tagged electronic image. The information display is configured by the controller to provide a user control 144b for untagging the image. In FIG. 9, the electronic image is untagged, but the maximum number of tagged images are already in use. The controller has configured the information display to show the Tag image indicia grayed out and the associated button 144a is disabled. Tagged images are identified by indicia 168 superimposed on the image display 32 or presented on the information display 118 or both. For example, the indicia can be a textual message of "tag" or "locked" or the like or an icon of the same effect.

The review of earlier images provided by the camera 10 can be variable to allow review of all images in chronological or other order and, alternatively, review of tagged or untagged images only in chronological or other order. The zoom toggle can be used to move between images. For electronic images not associated with film loaded in the camera 10, there can be provided an indicia (not shown) on the image display showing that the respective image is not from the current roll and APS photofinishing related features, such as print quantity, are no longer subject to change.

The tag selector 166 is connected to a memory manager, which can be a separate component, but is most conveniently provided by software and hardware features of the controller 36. The memory manager controls the FIFO queue and excludes tagged images from the queue. The memory manager is operatively connected to the communications port 124 and signals the memory 112 writer to terminate tags when respective image files are downloaded through the communications port 124. The memory manager also, optionally, includes the clocks 170 that are used to determine when time periods expire for the different electronic images in memory 112.

Figure 12:
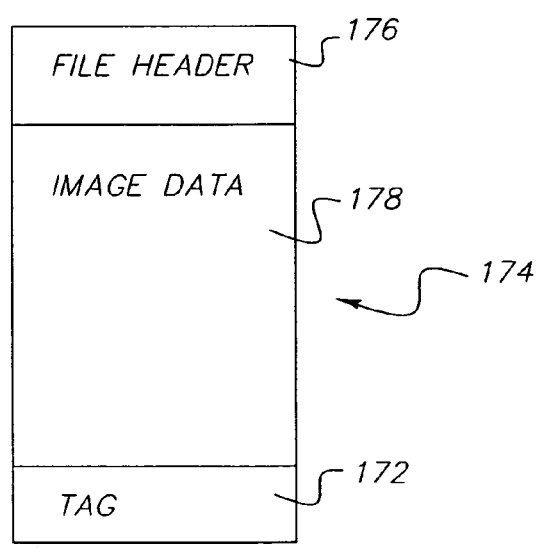
FIG. 12 is a diagrammatical view of one of the downloaded images shown in FIG. 11. In a particular embodiment, FIG. 12 also illustrates an electronic image within the camera of FIG. 1.

Referring to FIG. 12, a "tag 172" is a feature of an electronic image file 174 that, in combination with appropriate control system 34 software and hardware, prevents the memory 112 from erasing/writing over the respective image file recorded in the memory 112. Stated another way, a tag 172 is a type of image metadata that is associated with an individual image file and provides the indicated function. The file shown also has a header 176 and the data 178 for the particular image.

Some film units 18, such as APS film give the photographer an option of setting the number of prints for each image. When such a film unit 18 is removed from the camera 10, any electronic image with the print quantity set to zero that does not have a save tag stored in the associated electronic image, can be moved to the head of the FIFO image replacement queue. This can be done by changing the date associated with the respective files and is the equivalent of automatically erasing the files from memory 112. This operation delays overwriting of images that have a non-zero print quantity.

The camera 10 can optionally allow capture of scenes as electronic images without an accompanying film image. Such electronic-only images can be automatically tagged at the time of capture. Once captured, such electronic-only images are then treated in the same manner as other tagged images.

Use of a Dynamic Number of Stored Electronic Images Protected from Overwriting

Referring now particularly to FIGS. 1 and 6–12, rather than being fixed, the number of tagged images available can be dynamically varied to allow the maximum number of tagged images possible with the film unit 18 currently loaded and the capacity of the memory 112. For example, the memory 112 can have a capacity of 50 electronic images and film units 18 usable with the camera can have a maximum number of exposures of 15, 25 or 40. If the 15 exposure film unit is used, then 35 electronic images can be tagged. If the 25 exposure film unit is used, then 25 electronic images can be tagged. If the 40 exposure film unit is used, then 10 electronic images can be tagged. Of course, a lesser number of tagged images than the difference between the memory capacity and the number of film frames can also be provided, if desired.

In order to operate in this manner, the camera 10 determines the number of exposures available when a film unit 18 is loaded. This information is currently available on some film units 18 in the form of a bar code or the like. With APS film units, a data disk (not shown) on the end of the canister 22b indicates the number of exposures on the film unit 18 in the form of a circular bar code. The camera 10 has a reader 67 that can read the indication of the number of exposures on the film unit 18 and convey that information to the controller 36. With an APS film unit 18, the reader 67 can be a bar code reader in the form of an infrared emitter-sensor pair.

Some APS cameras 10 allow mid-roll change (abbreviated "MRC", sometimes referred to as mid-roll interchange "MRI"). Those cameras 10 detect the number of exposures available on a loaded film unit 18 and, in addition, detect the number of film frames 28 that have already been exposed. The number of tagged electronic images available, in a camera 10 that provides MRC can be based on the number of the unexposed film frames 28 available rather than the total number of film frames 28 on a film unit 18. Alternatively, the number of tagged electronic images available can be determined in the same manner as when a fully unexposed film unit 18 is loaded. The latter approach is currently preferred, since it has a lesser likelihood of confusing the user. For convenience, the discussion here is generally limited to situations in which a film unit 18 is removed only after exposure of all available film frames 28.

In order for the camera 10 to determine the maximum number of tagged images possible with the film unit 18 currently loaded, the camera 10 also has to know the capacity of the camera memory 112. The maximum number of tagged images possible is equal to the difference between the capacity of the memory 112 and the number of film frames 28 available on the film unit 18 currently loaded.

The capacity of the memory can be defined artificially as a fraction of the total memory of the camera. This approach may be needed for memory 112 that is shared with other components.

The capacity of the memory 112 is divisible, for purposes of analysis into unit spaces or subdivisions of the memory that can each hold a single electronic image captured by the camera. This analysis provides an integer value, in electronic image spaces, of the capacity. If all electronic images captured by the camera are of the same size, either initially or after a standardized compression procedure, then be capacity of the memory is simply a matter of dividing the physical capacity of the memory by the unit size of the electronic images. This calculation can be done ahead or provided as needed by the controller.

If electronic images stored by the camera are not necessarily of the same size, either due to differences in the effect of compression or for other reasons, then in the camera can still make the same calculation; but the calculation must be based upon a nominal size electronic image. To save processing, it is preferred that this nominal size electronic image be predefined rather than being estimated on the basis of earlier captured images. Any portion of memory attributable to the remainder of the analytical division used to determine the integer capacity, can provide a small reserve to accommodate one or more stored images of slightly excessive size. If wide variation in stored image sizes or other increase memory demand is expected, then the reserve can be increased in size by decreasing the capacity by one or more units.

The capacity of the memory can be set to an integer number of electronic image units that represent an arbitrary fraction of the total memory of the camera. This can be done by the controller and is useful, for example, if the physical memory 112 is removable and replaceable by another memory component of different capacity. (The memory 112 and the digital film unit 18 can share the same component; but are distinguished on the basis of the nature of the images stored and the use to which those images are put. The use of a removable component for memory 112 adds unnecessary complexity and for that reason is not preferred.)

In an embodiment in which the number of tagged images is set to a lower number than would be possible using all the capacity of the memory, the number of tagged images is still dynamic. The total of the number of tags plus the number of available film frames is kept constant. The total represents a maximum number of tags can be made available in that camera, by using a film unit with a minimum number of film frames. For example, a camera with a maximum capacity of 60 electronic images of a nominal size can be limited to a total number of tags plus film frames of 50. If available film units have 15, 25, and 40 film frames, then the maximum number of tags is 35. If a film unit is loaded that has 15 exposures, this provides for the maximum number, 35 tags. If a film unit is loaded that has 25 exposures, then the number of tags is 25.

Figure 6:
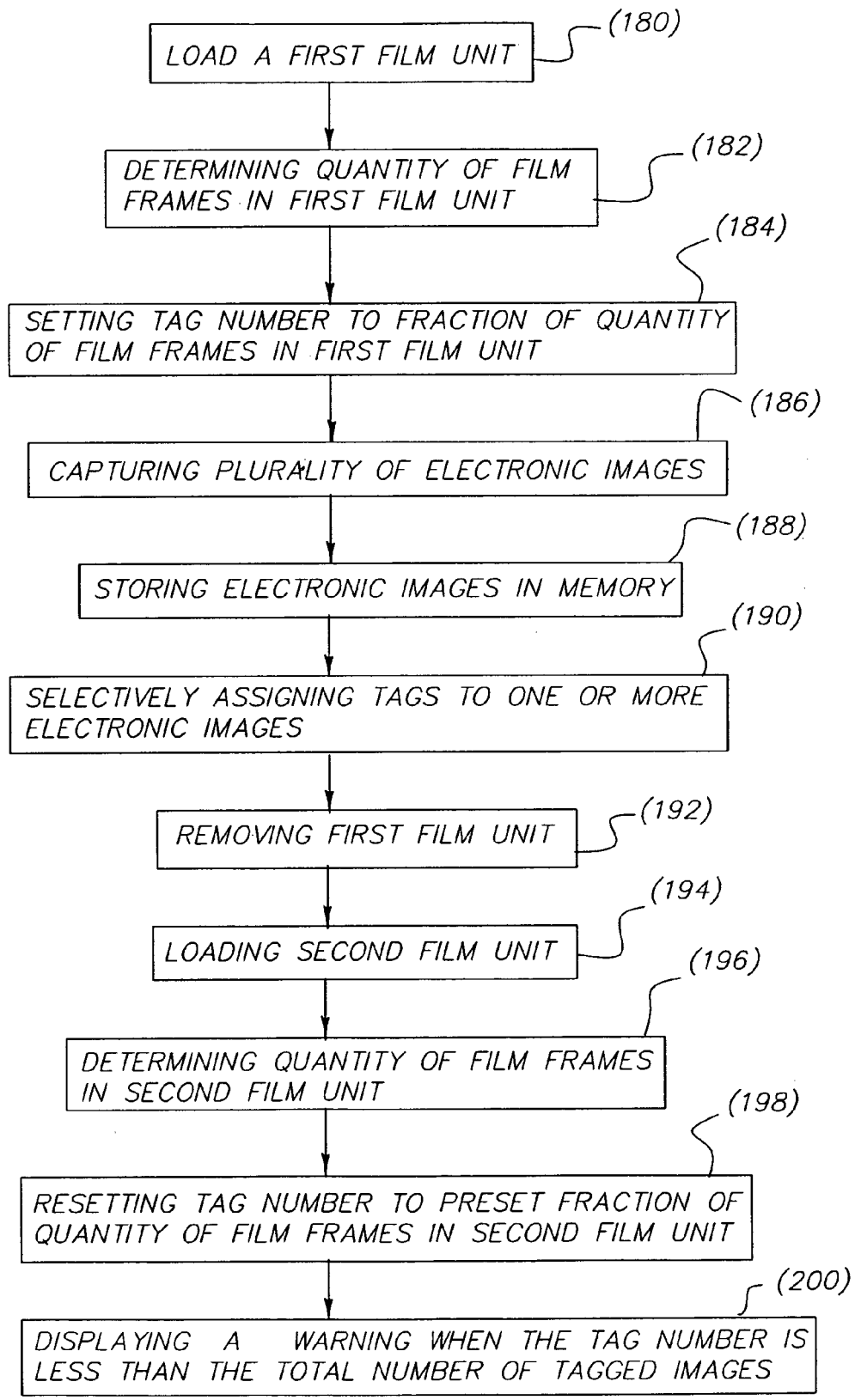
FIG. 6 is a flow chart of the method for maintaining a dynamic number of stored electronic images protected from overwriting.

Referring now to the method shown in FIG. 6, a first film unit 18 is loaded (180) into the camera 10. The first film unit 18 has a first quantity of film frames 28 available for exposure. This first quantity is determined (182) by the reader 67 and is communicated to the controller. A tag number is then set (184) by the controller as above-discussed.

The tag number is a preset fraction of the first quantity. In the embodiments discussed above; the tag number is 35, if a 15 exposure film unit 18 is used; 25 if a 25 exposure film unit 18 is used; and 10 if a 40 exposure film unit 18 is used.

A plurality of electronic images are then captured (186) and stored (188) in the memory 112 of the camera 10. Individual tags are selectively assigned (190) by the user to one or more of the electronic images resulting in respective tagged images. The first film unit 18 is removed (192) and a second film unit 18 is loaded (194). The second film unit 18 has a second quantity of film frames 28 available for exposure. This second quantity is determined (196) by the reader 67 and is communicated to the controller 36.

The controller 36 then resets (198) the tag number, on the same basis as with the first film unit 18. The number of images protected from overwriting, thus, is dynamic and a function of the currently loaded film unit 18.

The controller 36 totals the number of tagged images. This total is compared to the tag number after resetting. A warning is displayed (200) when the tag number is less than the number of tagged images.

It is convenient, if the controller 36 maintains a running total of tagged images during use, determining the number of tagged images prior to storing each new electronic image. On the other hand, if desired, the controller 36 can total the number of tagged images only prior to storing new images following the filling of the memory 112 to capacity. This approach is slightly more complex, but reduces processing requirements during initial image captures.

Figure 10:
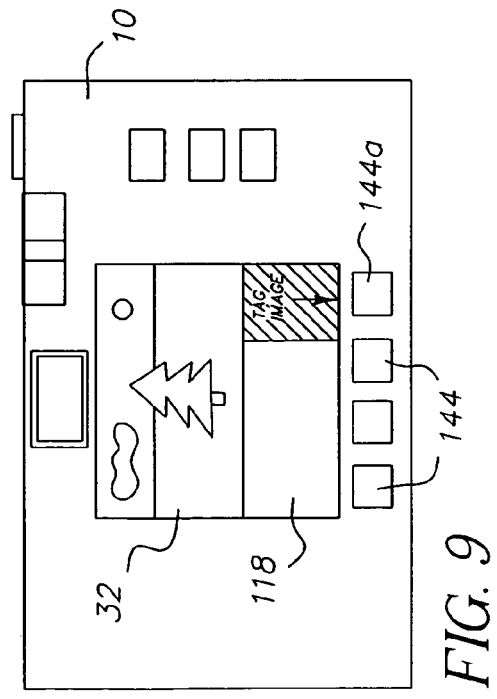
FIG. 10 is the same view as in FIG. 7, but the displays show a warning that tagged images will be overwritten if capture of images is continued without downloading or untagging images.

The warning can be presented in any manner, such as by indicia or an audible message using a speaker (not shown) on the camera 10, or a combination of the two. It is preferred that the warning is easily understood by the user. For this reason, a warning in the form of a simple warning light or the like, is not desirable. A warning in the form of a textual message or easily understood icon is currently preferred. Warning indicia can be presented on the image display 32 or the information display 118 or both. FIG. 10 illustrates an example warning message which indicates that the next 25 exposures will overwrite tagged images. The message also suggests downloading and gives the user the option of pressing one button to bring up verification images for review and untagging, as necessary. The message also allows the user to proceed by assenting to the overwriting of a tagged image (by pressing the "Yes" button). The message is repeated, with the number 25 diminishing as tagged images are overwritten, as additional new images are captured.

It is the intent of the warning to convey to the user that earlier tagged electronic images will be untagged and eventually overwritten and replaced with newly captured electronic images on a FIFO basis. It is preferred that the warning message indicate the number of tagged images that will be overwritten during the course of picture taking using the new film unit 18, since this gives the user a better idea as to the problem faced.

The user can respond to the warning message in several different ways. The user can unload the second film unit 18 and load a replacement film unit 18 having a lesser number of exposures than the second film unit 18 and, preferably, the same number of exposures as the first film unit 18. Another alternative available to the user when the warning is presented, is to immediately download electronic images before capturing additional film images. Still another alternative, is for the user to review the electronic images stored in the camera 10 and change tags such that can be total number of tagged images matches the current tag number. To make this more convenient, the earlier discussed warning can be interactive. In this case, after the user presses the edit images button 144c in FIG. 10, an image is displayed in edit mode, as shown in FIGS. 7–9. After cycling through images, as desired, the user can press button 144b, shown in FIG. 8, to untag one of the images. The display next shows a warning message like that shown in FIG. 10, except that the exposure count is reduced by one. The warning message is repeated each time a tag is removed, counting down the number of tagged images to be overwritten until space is available for all of the images of the new film unit or the user decides to proceed (by pressing the button "Yes" in FIG. 10) without removal of any more tags. Alternatively, the warning message, altered to show the correct count of tagged images subject to overwriting, is repeated only when the user exits the editing mode by pressing the shutter release 26 part way down or pressing another button 144 that provides that function, such as an "Enter" button (not separately identified in the drawings.

One more alternative for the user, is to respond to the warning by assenting to termination of the tag on the oldest tagged image. The user response can be actuation of a specific button, as illustrated in FIG. 10; or, alternatively, one or more actions leading to capture of a new image. The action or actions indicating user assent are signaled to the memory 112 module; which, in response, untags the oldest tagged image. The newly captured image is then saved. This process can be repeated with additional captured images until the total number of tagged images matches the current tag number.

One more alternative for the user, is to respond to the warning by assenting to termination of the tag on the oldest tagged image. The user response can be actuation of a specific button, as illustrated in FIG. 10; or, alternatively, one or more actions leading to capture of a new image. The action or actions indicating user assent are signaled to the memory 112 module; which, in response, untags the oldest tagged image. The newly captured image is then saved. This process can be repeated with additional captured images until the total number of tagged images matches the current tag number.

The change in tag number has the effect of adding the excess tagged images to the end of the FIFO replacement queue, in capture date order. This can be considered a second FIFO replacement queue of excess tagged images that succeeds the first FIFO replacement queue of untagged images.

Figure 11:
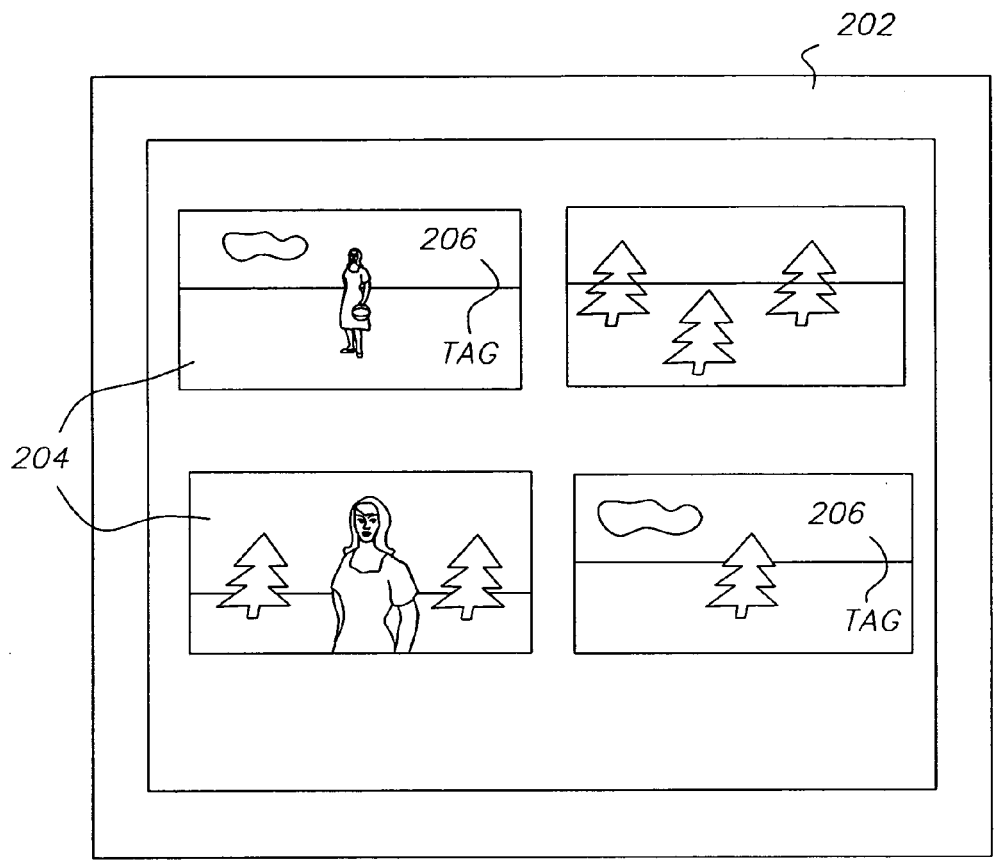
FIG. 11 is a front view of the monitor of the computer of FIG. 1 showing four downloaded images, two of which are tagged.

Downloading of Electronic Images Having Metadata Identifying Images Previously Excluded from First In-first Out Overwriting Referring now to FIGS. 1 and 11–12, in a particular embodiment of the camera 10 and method, the electronic images are downloaded through the communications port 124 to provide downloaded images in an image manipulation device 126, such as a personal computer, networked device, or digital appliance. The image manipulation device includes a computer monitor 202 that allows the downloaded images to be visualized and also includes software and hardware necessary to manipulate the downloaded images in some manner, such as digital editing, or printing, or photofinishing or the like.

In this embodiment, all of the electronic images in the camera 10 are downloaded, including both tagged images and on tagged images; when an image download is undertaken. The downloaded images 174 retain the tags 172, which were used in the camera 10 to identify the tagged images for exclusion from overwriting during FIFO electronic image replacement. These tags 172 can be identified by the image manipulation device and, using appropriate software known to those of skill in the art, can be displayed to the user along with the respective electronic image in the same manner as other metadata associated with an electronic image.

The system, as shown in FIG. 1, includes the camera 10 and an image manipulation device 126, such as a personal computer, connected or connectable through the communications port 124. The camera 10 differs from those earlier described in that the controller 36 transmits electronic images for downloading that include the tags 172 as metadata in the respective image files 174. A downloaded image is illustrated schematically in FIG. 12 and includes a file header 176, image data 178, and the tag 172.

The manner in which the downloaded images and the tags are displayed by the image manipulation device is not critical. The downloaded images can be displayed individually or in groups. Tags can be indicated by indicia, such as explanatory text or and icon. For example, in FIG. 11, four downloaded images 204 are shown and tags of respective images are shown by the superimposed word "tag" 206. Icons or other indicia could also be used.

The tag, whatever its form, simply identifies on the image manipulation device, which particular images were saved from overwriting in the camera 10. This information is useful to the user, because it tells the user which of the images were saved from overwriting in the camera 10. The information that a downloaded image was save tagged in the camera 10 is a quick and easy indication that the image was considered to be important at some point in time. This suggests to the user that the particular downloaded image may be more important than the untagged images and that the user may want to give more careful consideration to that downloaded image. The user can then make use of this information in organizing or printing or otherwise dealing with the downloaded images. This is particularly useful if the images were captured by more than one photographer. Whoever downloads the images knows that tagged images were valued by another photographer and can preserve those images or otherwise act on that information.

The advantage of this approach is that it is an extremely simple yes-no decision, and makes secondary use of a user decision already required during picture taking as a result of space constraints. This approach is not an organizational scheme, since there are only two categories, save from overwriting and do not save, and those categories do not differentiate image content. Much picture taking occurs during hectic or confusing circumstances. The simple decision to save or not save is much easier make in such circumstances than are organizing or categorizing decisions.

Camera Having Electronic Images Corresponding to Current Film Images Automatically Excluded from First In-first Out Overwriting and Method Referring now to FIGS. 13–17, in a modification of the cameras and methods, one subset of electronic images stored in camera memory is automatically excluded from first in-first out overwriting. Images of the other subset of electronic images are replaced on a FIFO basis when memory capacity is exceeded. The characteristic that defines the subsets is the presence or absence of a corresponding film image. The electronic only images can be retained and the electronic images corresponding to film images replaced as space is needed; however, it is currently preferred that the electronic images stored in memory, which correspond to latent images on a currently loaded film unit, are automatically excluded from first in-first out overwriting. The other subset of electronic images, which do not have corresponding film images in a film unit loaded in the camera, are replaced on a FIFO basis when memory capacity is exceeded. When the film unit is removed, the corresponding electronic images are moved to the first in-first-out replacement queue, in date and time order of capture.

The term "capacity" is used in the same sense here as elsewhere in the application. The capacity of the memory in a particular camera is subject to the same considerations as above discussed. It is preferred that the capacity of the memory is sufficient to hold an electronic image corresponding to each latent image on an expected film unit. For APS film, expected film units have 15, 25, or 40 film frames and the preferred memory capacity is sufficient to hold more than 40 electronic images. An excess of capacity beyond that needed to hold electronic images corresponding to the highest expected number of film images is even more preferred, since this allows the storage of electronic images for an entire film unit plus some number of electronic only images.

Figure 17:
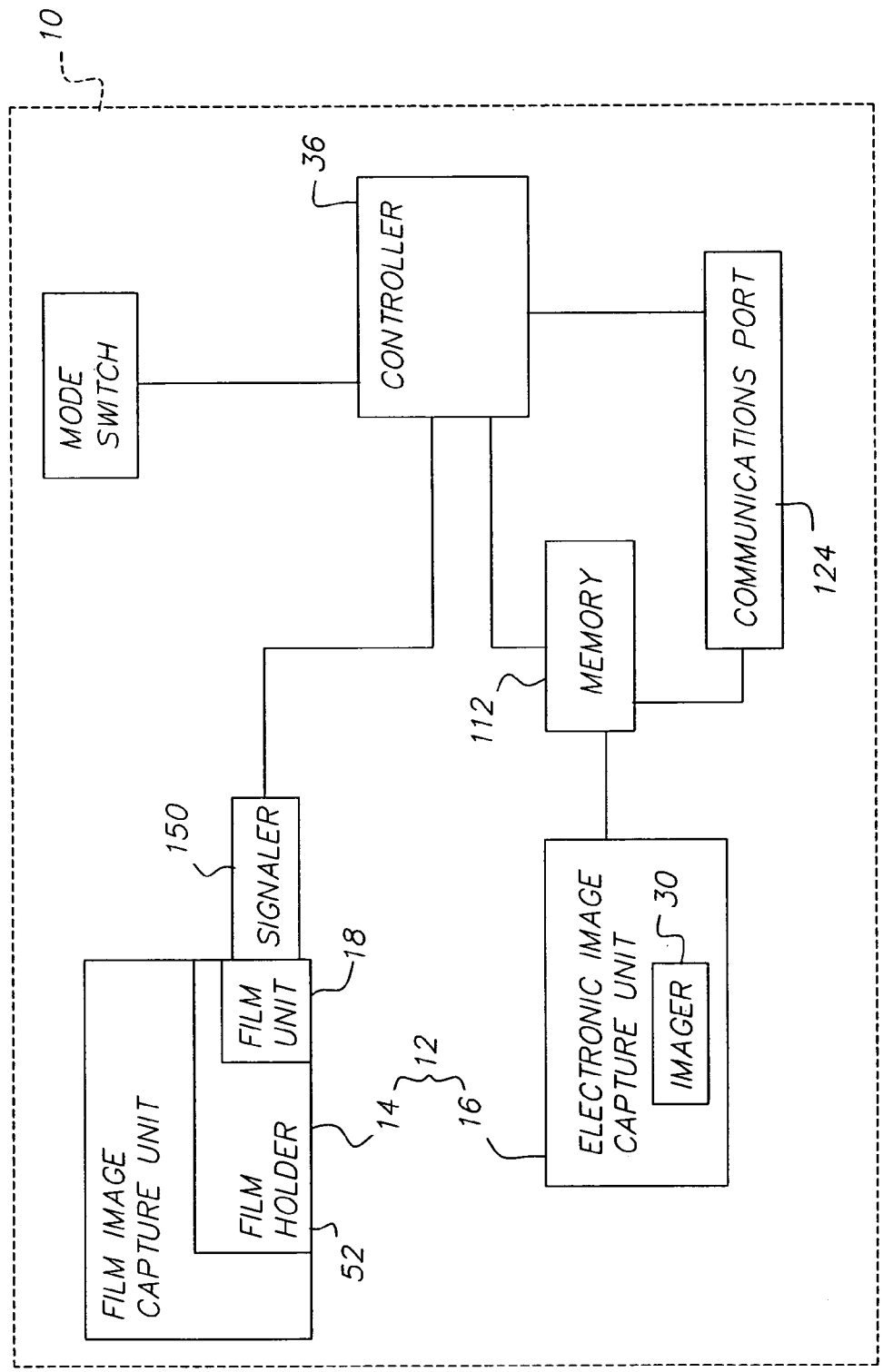
FIG. 17 is a schematic diagram of an embodiment of the camera of FIGS. 13–16.

FIG. 17 illustrates the modified camera, which is like the camera earlier described but simplified by removal of unnecessary features. For example, the tag selector is deleted. The camera can combine the features earlier disclosed with those of this modification; however, the use of both tags and automatic exclusion in the same camera is currently expected to be confusing to the user and is therefore not preferred.

In FIG. 17, the camera 10 has a film unit detector or signaler 150, which signals the controller 36 when a film unit 18 is present in the film holder and the film door 46 has been closed. The controller treats the signal as an indication that a film unit, earlier held by the film holder, has been removed and replaced by another film unit. The camera can alternatively, or additionally, include a reader 67, which can provide a similar function by reading an initial film unit, reading the absence of a film unit, then reading the second film unit loaded into the camera.

Figure 18:
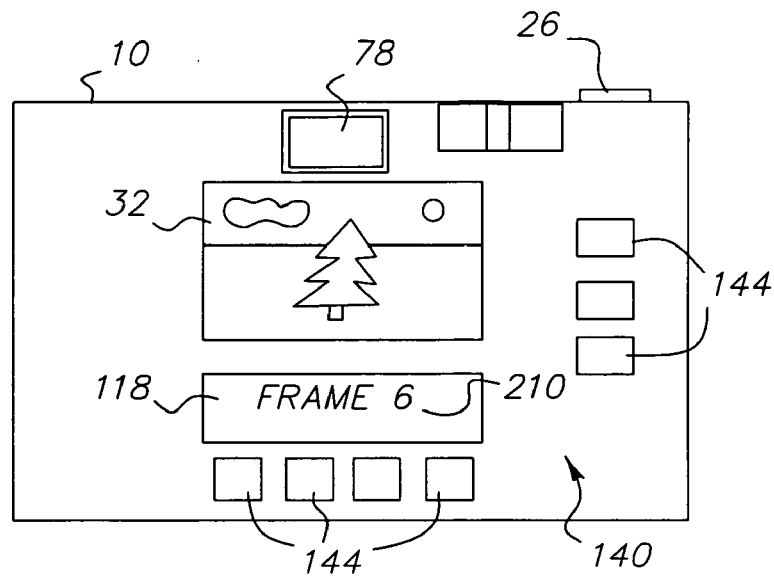
FIG. 18 is a semi-diagrammatical rear plan view of the camera of FIG. 17 showing a retained image on the image display.
Figure 19:
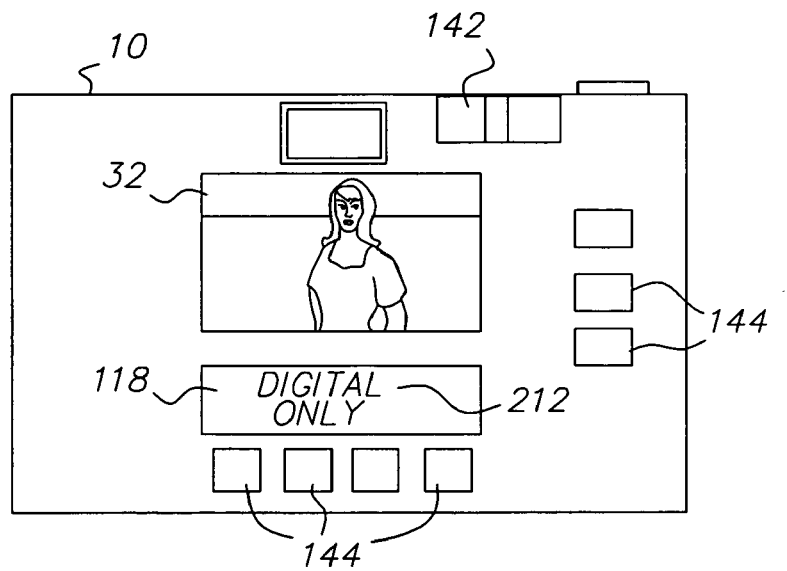
FIG. 19 is the same view as FIG. 18, but shows a non-retained image on the image display.

The controller categorizes the electronic images in memory of the camera as retained images, if the respective film unit is present, and as non-retained images if the respective film unit is absent. The retained images are recategorized by the controller as nonretained images when the respective film unit is removed. The manner in which the controller protects the retained images from FIFO overwriting and allows FIFO overwriting of the nonretained images is not critical. A wide variety of write protection schemes used in computers and other hardware can be used. For example, retained and non retained images can be kept in the different logical or physical partitions of memory, with different write protections and be switched between the partitions as needed. It is currently preferred that retained images be protected by the use of tags, in the same manner as earlier described. A distinction from the earlier description, is that the camera here has no tag selector, since the user has no ability to directly tag or untag images. The presence or absence of a "tag" could be directly indicated to the user, similar to what is shown on the image display 32 in FIG. 8; but this is not preferred, since the term "tag" is not explanatory in this case. A preferred approach is illustrated in FIG. 18–19, in which the user interface has a message 210, identifying a corresponding film frame of a displayed electronic image or another message 212 identifying the electronic image as lacking a corresponding film frame on the film unit (if any) currently loaded in the camera.

The camera includes a communications port operatively connected to the memory and controller. Electronic images are be downloaded through the communications port by connecting to a networked or local device, as earlier discussed. The camera can be configured to have the downloading change all electronic images to non-retained images; but, for simplicity, it is preferred that the downloading of the electronic images does not effect the status of the electronic images in memory as retained or non-retained images.

The camera can be further modified to provide mid-roll change. When an incomplete film unit is removed for mid-roll change, the controller can tag the electronic images corresponding to the latent images in the film unit, in the same manner as earlier described. The tags are then used, as earlier described, to prevent overwriting of the tagged electronic images. When said the film unit is reloaded into the camera, the tags can be removed and the electronic images corresponding to the latent images in the film unit can be treated in the same manner as if the film unit had never been removed. This assumes that the user, during any mid-roll change, only switches from a first film unit to a second film unit and then back to the first film unit. In other situations, it is necessary for the camera to be able to identify the first film unit when it is reloaded. The identification of film units in cameras by reading identification numbers, is well-known to those of skill in the art and any of a variety of approaches can be used. For example, the reader 67, can read an identification number on the film unit. If tags are provided by mid-roll change, then it is preferred that the tags are terminated after expiration of a period of time, as earlier discussed, in case the corresponding film unit is never reloaded.

It is currently preferred that, at mid-roll change, the controller cease blocking replacement of the electronic images corresponding to the latent images on the film unit. The electronic images corresponding to the latent images on the mid-roll changed film unit, then enter the FIFO replacement queue, in date and time order of capture. This approach is simpler and less confusing than the use of tags and still allows mid-roll change. Another likewise preferred alternative is to not implement mid-roll change in the camera. For convenience, most discussion here is limited to embodiments in which mid-roll change is not implemented.

The camera can be limited to a mode in which a film image and a corresponding electronic image are captured at every capture event. It is preferred that the camera is selectively switchable by the user, between two modes: a film and electronic capture mode and an electronic only capture mode. A two-position mode switch 208 that can provide this function is illustrated in FIG. 17. Electronic only capture mode images do not have a corresponding latent image and immediately enter the FIFO replacement queue. When a film unit is removed electronic images corresponding to latent images in that film unit, at that time, enter the FIFO replacement queue. Multiple queues and complex queue orders can be provided, but it is preferred, for simplicity, that all electronic images in the FIFO replacement queue are in overall time and date order of capture.

The camera can alternatively provide three modes: a film and electronic capture mode, an electronic only capture mode, and a film only capture mode in which no electronic image is captured. This approach is not preferred, because this mode lacks the benefit of reviewing a verification image after scene capture.

FIGS. 13–16 illustrate, in diagrammatical form, four different examples of capture of a sequence of images using the modified camera of FIG. 17. In these examples, the camera memory is defined as having a capacity to hold seven electronic images of uniform size and the film unit is defined as having film frames for five latent images. It will be apparent that these numbers are a convenience for explanatory purposes and not limiting.

Figure 13:
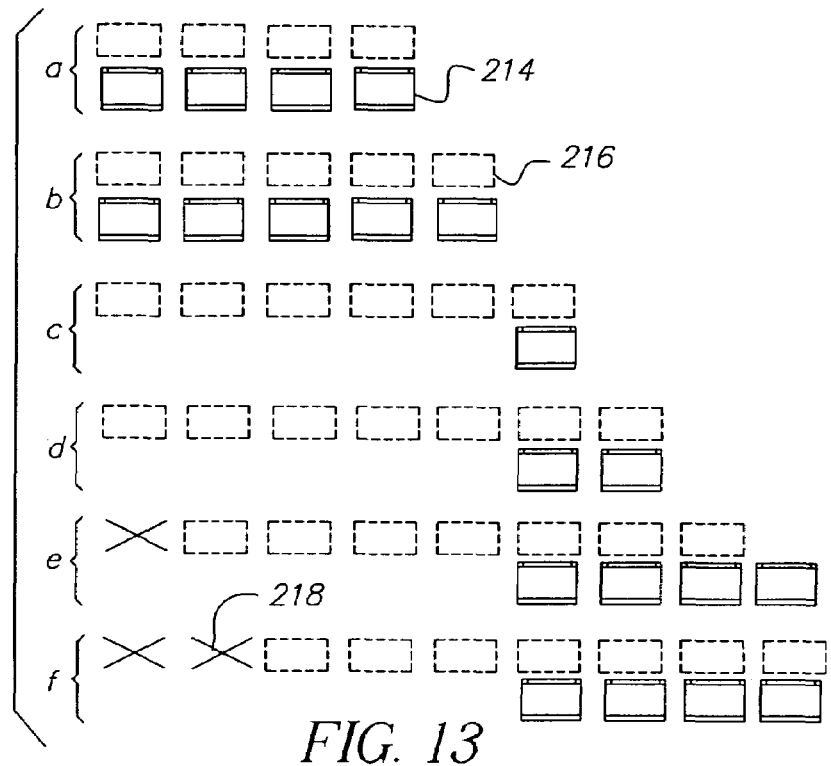
FIGS. 13–16 are diagrammatical views illustrating the replacement order in a modified camera and method. Each of FIGS. 13–16 shows the effect of this replacement order on a different sequence of capture events. Rows a–f in each of FIGS. 13–16 illustrate captured images present in the camera, following each capture event of a sequence. Film images are depicted by a film frame shown in solid lines. Electronic images by dashed line boxes. Vertically adjoining film images and electronic images correspond to the same scene image. "X" represents an electronic image that has been replaced. Within each row, an empty space below an electronic image indicates that no corresponding film image is present in the camera.

Referring now to FIG. 13, at a first stage indicated by "a", four scene images have been captured with the camera, as image pairs having both latent film images 214 and corresponding electronic images 216 in the memory. At stage "b", in FIG. 13, an additional scene image has been captured as both an electronic image and a film image. In stage "c", the film unit has been unloaded and replaced by a second film unit. This removes the five latent images earlier captured, but leaves the corresponding five electronic images. An additional sixth scene image is captured as an electronic image-latent image pair on the second film unit. In the next stage, "d", an additional scene image is captured as an electronic image and corresponding film image. This fills up to be memory of the camera to capacity. As a result, in stage "e", when a new scene image is captured as a latent film image and corresponding electronic image, the earliest electronic image stored in memory is replaced by the newly captured electronic image of the final electronic image-latent image pair. The absence of the earlier image is indicated by an "X" bearing reference numeral 218. This is repeated in the final stage, "f".

Figure 14:
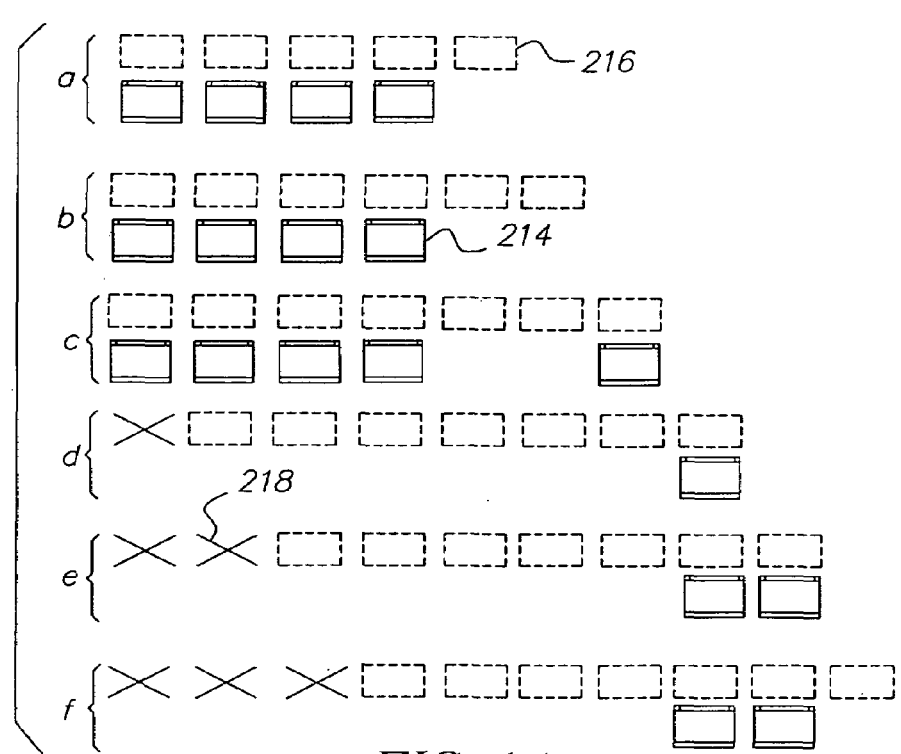

Referring now to FIG. 14, in stage "a", initially presented are four latent images and corresponding electronic images. Following the four pairs of images is an electronic image without a corresponding latent film image. Another such electronic image without corresponding latent image is captured in stage "b". In stage "c", a new image pair is captured. This fills of the capacity of the film units and, incidentally, also completely fills the capacity of memory with electronic images. Therefore, in the next stage, "d", when another scene image scene image is captured as both a latent image and an electronic image, the earliest electronic image previously stored in memory is replaced. This is repeated in stage "e". In stage "f", an electronic image is captured "solely", that is, without a corresponding latent film image, and the earliest electronic image in memory is again replaced.

Figure 15:
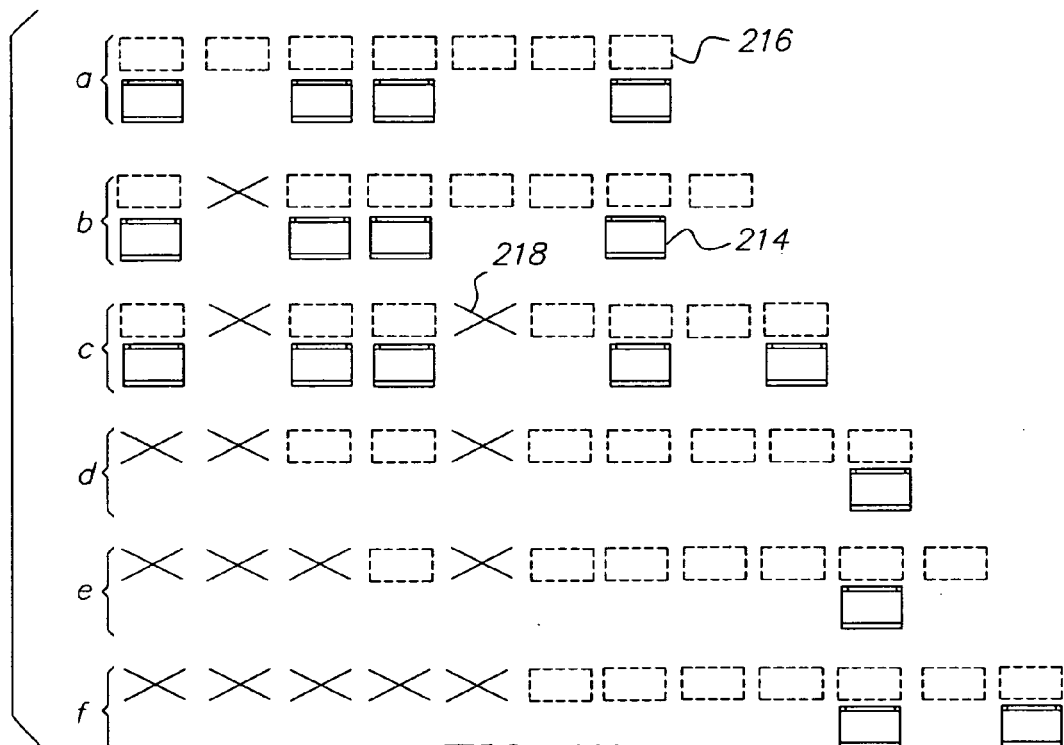

Referring now to FIG. 15, at stage "a", the first image pair captured is followed by a solely electronic capture followed by two more image pairs, two more solely electronic captures, and another image pair. In stage "a", the film unit has four latent images, but the memory is filled to capacity with seven electronic images. In stage "b", another solely electronic image is captured. The electronic image replaced is the earliest electronic image that does not have a corresponding latent image in the camera. In stage "c", an image pair is captured and again the earliest electronic image not having a corresponding latent film image in the camera is replaced. This fills the film units with five latent images. In stage "d", the first film unit is replaced by a second film unit and another image pair is captured. The electronic image replaced is the earliest that lacks a corresponding film image in a film unit loaded in the camera. With the replacement of the film unit, all of the electronic images save the last, no longer have corresponding latent images. In stage "e", another solely electronic image is captured and the earliest electronic image in memory is replaced. This is repeated for capture an image pair in stage "f".

Figure 16:
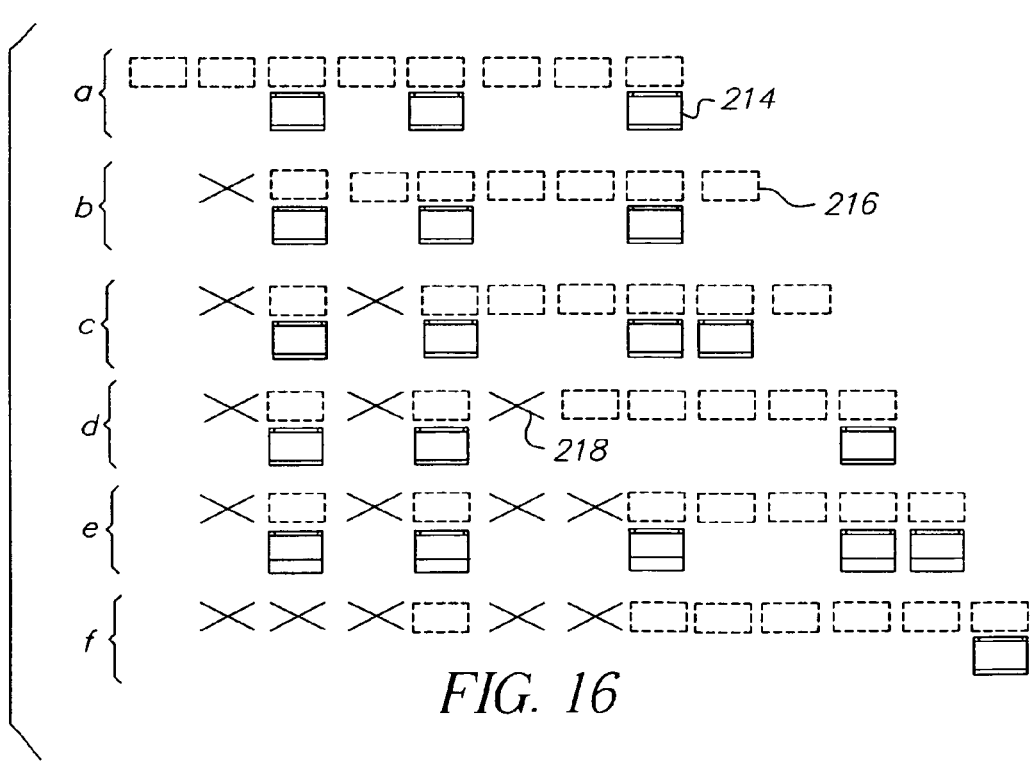

In FIG. 16, at stage "a", seven electronic images are in memory and three of them have corresponding latent images in the film unit. In stage "b", an additional electronic image is captured replacing the earliest electronic image. In stage "c", this is repeated. In stage is "d" and "e", two image pairs are captured and the two earliest electronic images are replaced. In stage "f", the filled film unit is replaced by a second film unit and a new image pair is captured.

The invention has been described in detail with particular reference to certain preferred embodiments thereof, but it will be understood that variations and modifications can be effected within the spirit and scope of the invention.

What is claimed is:

1. A method for managing electronic images successively captured when a camera is in an image capture mode, said method comprising:
    capturing a first plurality of electronic images when said camera is in said image capture mode;
    filling a memory in said camera to capacity with said first plurality of electronic images;
    capturing a second plurality of electronic images when said camera is in said image capture mode, following said filling;
    selectively assigning individual tags to one or more of said electronic images in said memory to define tagged images, which are to be excluded from an automatic first in-first out replacement of electronic images in said memory, and untagged images, which are subject to the automatic first in-first out replacement of electronic images in said memory;
    during said capturing of said second plurality of electronic images, automatically first in-first out replacing said untagged images in said memory;
    retaining said tagged images in said memory during said automatically first in-first out replacing, to exclude said tagged images from the automatic first in-first out replacement;
    downloading together said tagged electronic images and said untagged electronic images in said memory to provide a set of downloaded images external to said camera; and
    retaining said tags in said downloaded images corresponding to said tagged electronic images.

2. The method of claim 1 further comprising selectively terminating one or more of said tags of said tagged images in said memory prior to said downloading so that one or more of said tagged images are redefined as untagged images in said memory.

3. The method of claim 1 further comprising terminating said tags of said tagged images in said memory automatically responsive only to said downloading so that said tagged images are redefined as untagged images in said memory.

4. A The method of claim 3 wherein said terminating said tags of said tagged images in said memory occurs simultaneously with said selectively assigning individual tags to one or more of said electronic images in said memory.

5. A hybrid electronic-film camera having an image capture mode for use with photographic film units, said camera comprising:
   a body;
   an electronic capture unit disposed in said body, said electronic capture unit capturing a sequence of electronic images when said camera is in said image capture mode;
   a memory disposed in said body in operative relation to said electronic capture unit, said memory storing said electronic images and having a predetermined storage capacity;
   a tag selector disposed on said body, said tag selector selectively tagging selected ones of said electronic images in said memory with electronic tags to define said electronic images having said tags as tagged images, which are to be excluded from an automatic first in-first out replacement of electronic images in said memory, and to define said electronic images lacking said tags as untagged images, which are subject to the automatic first in-first out replacement of electronic images in said memory, said tag selector being capable of selectively detagging individual ones of said tags; and
   a memory manager operatively connected to said memory and said tag selector, said memory manager automatically first in-first out replacing said untagged images in said memory when said sequence of electronic images exceeds said storage capacity and blocking said automatically first in-first out replacing to exclude said tagged images from the automatic first in-first out replacement; and
   a communications port operatively connected to said memory, said port being selectively useable to download together all of said tagged images and all of said untagged images in said memory.

* * * * *